United States Patent
Lucidarme et al.

(10) Patent No.: US 11,593,898 B2
(45) Date of Patent: Feb. 28, 2023

(54) METHOD FOR PROCESSING DATA AND APPARATUSES FOR IMPLEMENTING THE SAME

(71) Applicant: ELECTRICITE DE FRANCE, Paris (FR)

(72) Inventors: Thierry Lucidarme, Chevreuse (FR); Stephane Dupre la Tour, Saint-Germain en Laye (FR)

(73) Assignee: ELECTRICITE DE FRANCE, Paris (FR)

( * ) Notice: Subject to any disclaimer, the term of this patent is extended or adjusted under 35 U.S.C. 154(b) by 413 days.

(21) Appl. No.: 16/674,523

(22) Filed: Nov. 5, 2019

(65) Prior Publication Data

US 2020/0143490 A1    May 7, 2020

(30) Foreign Application Priority Data

Nov. 6, 2018   (EP) .................................... 18306457

(51) Int. Cl.
*G06Q 50/06* (2012.01)
*G06F 16/21* (2019.01)
(Continued)

(52) U.S. Cl.
CPC .......... *G06Q 50/06* (2013.01); *G06F 16/211* (2019.01); *G06F 16/2365* (2019.01); *G06Q 20/389* (2013.01); *G06Q 40/04* (2013.01)

(58) Field of Classification Search
CPC ........ G06Q 50/06; G06Q 30/06; G06Q 20/14; G06Q 20/38; G06Q 20/10; G06Q 20/22;
(Continued)

(56) References Cited

U.S. PATENT DOCUMENTS

2016/0284033 A1* 9/2016 Winand ............... H02J 13/0017
2020/0108725 A1* 4/2020 Tarnowsky ............. B60L 53/68

FOREIGN PATENT DOCUMENTS

JP         2019153275      *  3/2018  ............. G06Q 50/06

OTHER PUBLICATIONS

Hong Liu, Yang Zhang, Tao Yang, "Blockchain-Enabled Security in Electric Vehicles Cloud and Edge Computing", IEEE Network, May/Jun. 2018 (Year: 2018).*

(Continued)

*Primary Examiner* — Hao Fu
(74) *Attorney, Agent, or Firm* — Faegre Drinker Biddle & Reath LLP

(57) ABSTRACT

A computer-implemented method is provided, which comprises: determining a current block stored in a blockchain data structure stored in the database, which comprises data related to a first energy transfer transaction for transferring charge from a community member device; searching the blockchain data structure for predetermined data indicating an energy transfer from at least one primary energy provider device controlled by a primary energy provider to the community member device, upon determining in the blockchain data structure at least one block containing the predetermined data, generating a new block with data corresponding to a current reward transaction between the primary energy provider and the community member, based on data of the at least one block and data of the current block; and adding the new block in the blockchain data structure.

16 Claims, 12 Drawing Sheets

(51) Int. Cl.
*G06F 16/23* (2019.01)
*G06Q 20/38* (2012.01)
*G06Q 40/04* (2012.01)

(58) Field of Classification Search
CPC ...... G06Q 20/36; G06Q 40/12; G06Q 20/102; G06Q 20/389; G96Q 10/06; G06F 16/211; G06F 16/2365
See application file for complete search history.

(56) References Cited

OTHER PUBLICATIONS

Cheng et al., "Deterministic Proof of Work," Arxiv.org, Cornell University Library, Ithaca, NY, Aug. 13, 2018, arXiv: 1808.04142v1, pp. 1-11.
Liu et al., "Adaptive Blockchain-Based Electric Vehicle Participation Scheme in Smart Grid Platform," IEEE Access, Jun. 5, 2018, vol. 6, pp. 25657-25665.
Liu et al., "Blockchain-Enabled Security in Electric Vehicles Cloud and Edge Computing," IEEE Network, IEEE Service Center, New York, NY, US, May 1, 2018, vol. 32, No. 3, pp. 78-83.
European Search Report issued in related application EP 18306457.5, dated May 6, 2019, 8 pages.

* cited by examiner

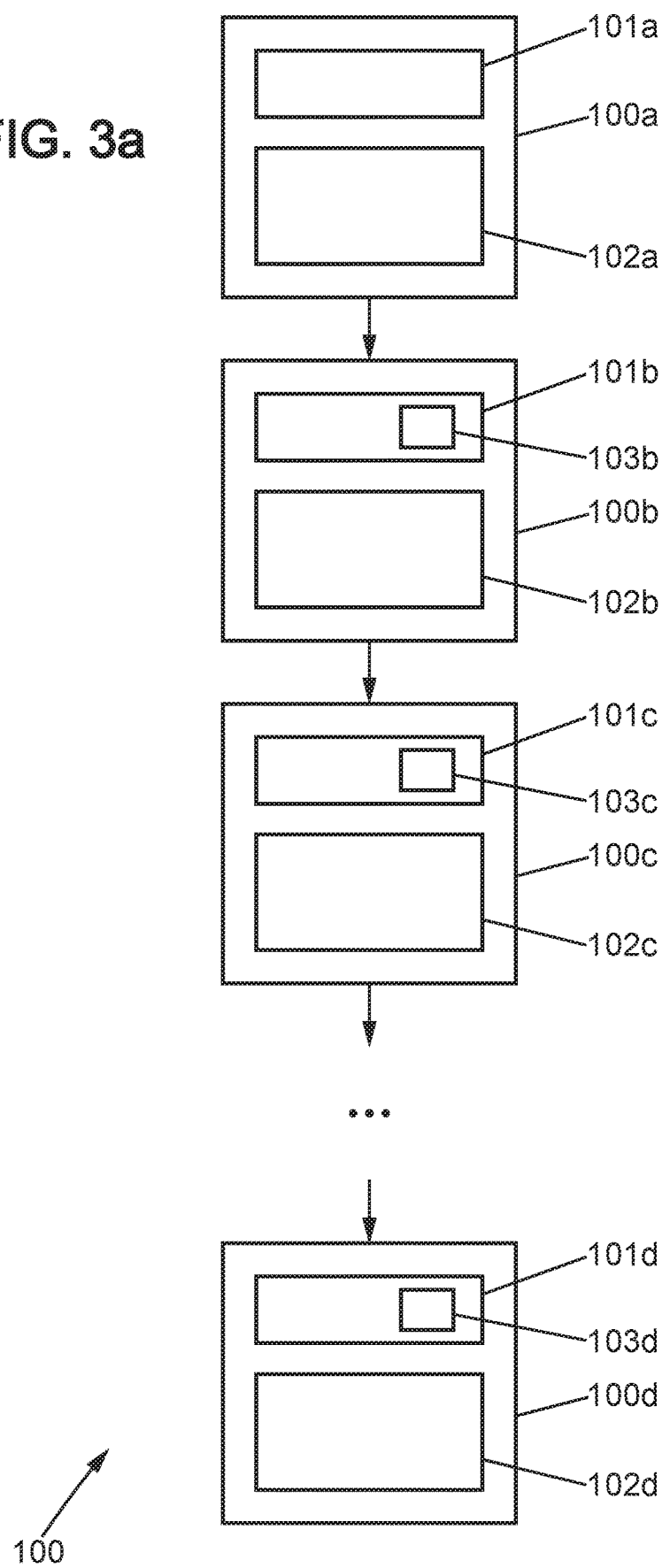

METHOD FOR PROCESSING DATA AND APPARATUSES FOR IMPLEMENTING THE SAME

CROSS-REFERENCE TO RELATED APPLICATION

This application claims priority benefit under 35 U.S.C. § 119(d) from European Patent Application No. 18306457.5, filed Nov. 6, 2018, the disclosure of which is incorporated by reference herein in its entirety.

FIELD

The present disclosure relates to the field of data processing, in particular processing of data representing digital charging transactions.

BACKGROUND

A blockchain is a distributed digital ledger that stores transactions between users chronologically, in such a way that the recorded data is verifiable and immutable. Transactions are written into a public ledger that is maintained by a group of decentralised computers or nodes, each in possession of an identical copy of the ledger. Changes to the ledger are recorded by all nodes, making it essentially impossible to create fraudulent transactions. As a result of this process, the blockchain technology is described as trust-less because it removes the need for a third party to manage transactions between two users.

Different distributed consensus protocols have been developed for the addition of new blocks (corresponding to one or more transactions) into a blockchain ledger, which may be classified into two main types, known as proof of work (POW) protocols, and proof of stake (POS) protocols.

In proof of work protocols, the validity of each new block is verified by users ("miners") solving a complex mathematical problem. The mathematical problem is difficult to solve (requiring significant computing power and therefore energy expenditure) but easy to check once solved. The first miner to solve the problem is rewarded with an amount of cryptocurrency. The security of a PoW network is ensured by the prohibitively high processing requirements that would be associated with an attempted hack on such a network, the costs of which would be higher than any reward that might be obtained through a successful attack. However, PoW systems have an inherent environmental impact, which led to the development of alternative, more energy efficient, consensus protocols.

Proof of stake protocols are an example of such protocols, and were developed to address the power consumption problems of PoW. Instead of adding blocks to the ledger via a complex mathematical problem, mining power is determined by a miner's proportion of coins, or stake. By demonstrating ownership of a certain percentage of cryptocurrency, a miner is permitted to mine an equivalent percentage of transactions in the PoS system. Rather than a cryptocurrency reward as in PoW, PoS contributors earn the transaction fee associated with a particular block. The security of the system is maintained because each PoS contributor (known as a "forger") is required to lay down their own assets to take part in transaction verification, with the risk of losing their stake if they validate an illegitimate transaction. Proof of Stake also protects against "51% attacks" which can affect PoW systems, whereby a user possessing a disproportionate amount of cryptocurrency can result in a form of centralisation of the network. In a PoS system, a user would need to possess an extremely large amount of cryptocurrency in order to do initiate such an attack.

Peer to Peer (P2P) energy transactions are a method of transferring charge directly between two users or entities. The system is being investigated for use in distributed electric vehicle (autonomous or otherwise) charging; as an example, a homeowner in possession of electric vehicle charging equipment may offer electricity to a passing electric vehicle for a fee.

In the future, electric vehicles may take part in energy transfer transactions over the course of a journey as and when they require power or power is required from them. Many micro-transactions may take place over a relatively short period of time, and each transaction must be accurately and verifiably recorded without causing unnecessary inconvenience to vehicle owners.

Under this new energy distribution paradigm, energy distribution operators, which may be seen as primary energy provider, as opposed to, for example, electric vehicles providing energy to other electric vehicles which may be seen as secondary energy provider, may want to monitor and/or control the circulation of energy which they provide to their customers.

In addition, assuming that P2P energy transactions are performed by end users registered to use an energy transaction service provided by a broker, potentially independently from energy distribution operators, energy distribution operators may want to create an incentive for the end users to resell energy that was originally acquired from them.

There is therefore a need for providing an improved database management scheme and apparatuses implementing the same that address at least some of the above-described drawbacks and shortcomings of the conventional technology in the art.

SUMMARY

It is an object of the present subject disclosure to provide an improved database management scheme and apparatuses implementing the same.

Another object of the present subject disclosure is to provide an improved database management scheme for processing transaction data related to energy transfer transactions recorded in a blockchain and apparatuses implementing the same for alleviating the above-described drawbacks and shortcomings of conventional database management schemes using a blockchain, in particular in cases where large numbers of micro-transactions result in large amounts of transaction data to be processed using the blockchain.

Yet another object of the present subject disclosure is to provide an improved database management scheme for managing transaction data recorded in a blockchain and apparatuses implementing the same for alleviating the above-described drawbacks and shortcomings of conventional database management schemes using a blockchain, in particular for the monitoring and/or controlling of the circulation of energy as recorded in the blockchain.

Yet another object of the present subject disclosure is to provide an improved database management scheme for managing transaction data recorded in a blockchain and apparatuses implementing the same for alleviating the above-described drawbacks and shortcomings of conventional database management schemes using a blockchain, in particular for the monitoring and/or controlling of transaction data representing charging transactions whereby charge was provided from a primary energy provider.

To achieve these objects and other advantages and in accordance with the purpose of the present subject disclosure, as embodied and broadly described herein, in one aspect of the present subject disclosure, a computer-implemented method is proposed. The method comprises: determining a current block stored in a blockchain data structure stored in the database, which comprises data related to a first energy transfer transaction for transferring charge from a community member device, further to the determination of the current block, searching the blockchain data structure for predetermined data indicating an energy transfer from at least one primary energy provider device controlled by a primary energy provider to the community member device, upon determining in the blockchain data structure at least one block containing the predetermined data, generating a new block with data corresponding to a current reward transaction between the primary energy provider and the community member, based on data of the at least one block and data of the current block, and adding the new block in the blockchain data structure.

In the future, electric vehicles are likely to become more prevalent on our roads and will require appropriate infrastructure to support them. Further, increasingly autonomous devices will be able to share information and resources without the need for human oversight, which presents opportunities for intelligent energy trading systems on a device-to-device basis. However, users require an accurate record of any transaction that might take place in order for funds to be transferred as required, but do not want the inconvenience of having to monitor all transactions manually, or they want to perform such transactions with minimum human to devices interactions.

In some embodiments, the search is performed on at least one block of a search block set in the blockchain data structure, wherein each block of the search block set other than the current block precedes the current block in the blockchain data structure.

A search set may in such cases be defined, which advantageously allows limiting the search scope in the blockchain which may potentially include a very large number of blocks. The computation power necessary for the search may therefore be controlled. Preferably, search block set may comprise a predetermined number of successive blocks of the blockchain, each preceding the current block in the blockchain.

In some embodiments, the method further comprises: receiving, from the community member device, a detailed state of charge, DSOC, data record of an energy storage unit of the community member device, wherein the DSOC data record comprises data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit; and generating, based on the DSOC data record, the current block to be inserted in the blockchain data structure and comprising transaction data related to a charging transaction corresponding to an energy transfer between the community member device and a charged device for transferring charge from the energy storage unit of the community member device to the charged device, wherein the DSOC data record comprises information related to an amount of charge transferred from the energy storage unit of the community member device to the charged device.

A DSOC data record may be received from the community member device, as such device may have its own DSOC data record stored in the blockchain and/or stored locally, as updated per new charging transactions performed by the device. In such case the searching the blockchain data structure for predetermined data may comprise the retrieving the DSOC data record from the blockchain data structure, or the rebuilding a DSOC data record from data retrieved from the blockchain data structure, as explained below in further details. The generating the new block may in such cases be based on the DSOC data record.

In some embodiments, the predetermined data may comprise a detailed state of charge, DSOC, data record of an energy storage unit of the community member device, wherein the DSOC data record comprises data representing a sequence of one or more subsequent charging transactions for transferring charge from the primary energy provider to the energy storage unit, data representing a maximum state of charge of the energy storage unit, and, for each charging transaction, data representing an amount of charge acquired by the energy storage unit.

In such cases, a device DSOC data record for the device may not be received from the device, and may be obtained from the blockchain by a blockchain management server. The obtaining of a DSOC data record may include the retrieval of the DSOC data record directly from the blockchain, the rebuilding a DSOC data record from data retrieved from the blockchain data structure, or a combination thereof.

Using a DSOC data record advantageously circumvents the scope of the search in the blockchain, in particular in embodiments where a DSOC data record is stored in the blockchain, e.g. in transaction data associated with an eligible charging transaction during which the device received charge.

In some embodiments, the predetermined data may comprise identification information of the primary energy provider and transaction type information indicating at a type of transaction for transferring charge provided by the primary energy provider to the community member device. The search may then be advantageously limited to certain transactions performed with the primary energy provider.

In some embodiments, the search in the blockchain may be performed as a loop, in which case the method may further comprise: performing iterations of a blockchain sequential search loop, wherein each iteration of the loop comprises: searching for the predetermined data in a payload part of a current search block immediately following in the blockchain a previous search block processed during an immediately preceding iteration of the loop, wherein the loop is initialized with the current search block immediately preceding the current block in the blockchain.

In some embodiments, the method may further comprise: determining current transaction data of the new block based on respective amounts of energy transferred from the primary energy provider to the community member device, and/or respective amounts of energy transferred from the community member device. The new block may correspond to a reward provided by a primary energy provider to the user of the device in the form of a charge credit. Such charge credit may be reflected in transaction data generated for the new block, which advantageously may be based on respective amounts of energy transferred from the primary energy provider to the community member device (in the case of multiple energy transfer from the primary energy provider with no corresponding reward), and/or respective amounts of energy transferred from the community member device. The reward may be based solely on the amount of energy transferred from the community member device, or based on the amount of energy transferred from the community member device to the extent that such energy had been acquired from the primary energy provider.

In some embodiments, the method may further comprise: further to the determination of the current block, searching the search block set in the blockchain for determining at least one second block, other than the current block, containing data related to at least one second energy transfer transaction for transferring charge from the community member device; and generating the new block based on data of the at least one second block.

The search in the blockchain may lead to identifying several blocks containing data related to respective energy transfer from the community member device, in which case the generation of the new block may advantageously take into account such identified blocks.

Likewise, the search in the blockchain may lead to identifying several blocks containing the predetermined data, in which case the generation of the new block may advantageously take into account such identified blocks. In some embodiments, the method may then further comprise: upon determining in the blockchain a plurality of blocks containing the predetermined data, generating the new block based on data of the plurality of blocks.

In some embodiments, the method may further comprise: further to the determination of the current block, searching the search block set in the blockchain for determining at least one third block containing data corresponding to a reward transaction between the primary energy provider and the community member; and generating the new block based on data of the at least one third block.

Advantageously, a search in the search set may also be conducted to identify one or more third blocks that correspond to reward transactions already granted to the community member device. This may be particularly relevant in the cases where several blocks are identified in the search set from the search for predetermined data, as some of those blocks may correspond to charging transactions from the community member device which already have been rewarded.

In another aspect of the present subject disclosure, a computer-implemented method of managing a charge of an energy storage unit of a community member device is proposed, which comprises: obtaining a first detailed state of charge, DSOC, data record of the energy storage unit, wherein the DSOC data record comprises data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit; generating a second DSOC data record by updating the first DSOC data record, based on a current state of charge of the energy storage unit; performing an energy transfer with a charged device for transferring charge from the energy storage unit of the community member device to the charged device; and generating a third DSOC data record by updating the second DSOC data record, based on an amount of charge transferred from the energy storage unit of the community member device to the charged device.

This charge management method advantageously allows a device to manage (including track, record, and update) its own DSOC data record, which may provide a history of charging transactions through which the device acquired charge. Such history may advantageously used by a central management function for verification and validation purposes. Further, the DSOC data record may advantageously be used to transfer, along an amount of charge transferred from the community member device, a history of charge acquisition for the transferred charge.

In some embodiments, the obtaining the first DSOC data record may comprise: searching blocks of a blockchain data structure for determining a most recent block containing a DSOC data record for the community member device.

In some embodiments, the charge management method may further comprise: transmitting the third DSOC data record to a server for the generation, based on the third DSOC data record, of a block to be inserted in a blockchain data structure and comprising transaction data related to a charging transaction corresponding to the energy transfer. Preferably, the transaction data will comprise the third DSOC data record.

In another aspect of the present subject disclosure, an apparatus is proposed, which comprises a processor, a memory operatively coupled to the processor, and network interfaces to communicate in a computer network, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 3a shows an exemplary architecture of a blockchain data set;

DETAILED DESCRIPTION

Figure 1:
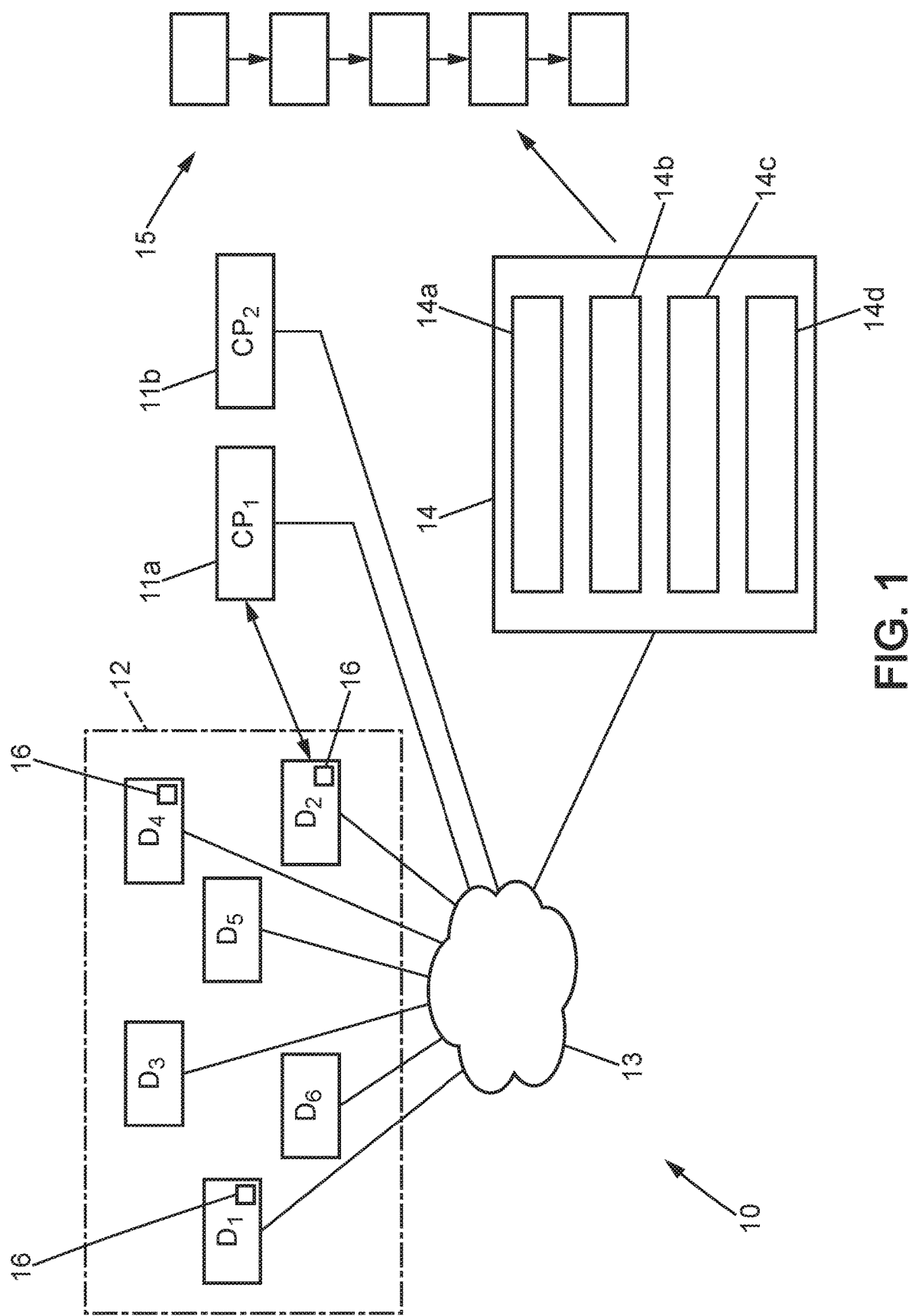
FIG. 1 shows an exemplary system in which the proposed method may be used in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

In the following description and claims, the terms "payload", "payload data", "message", "packet", and "data packet" may be indifferently used, and may include data blocks, protocol data units or any unit of data that may be routed or transmitted between nodes or stations or across a network. A packet may include a group of bits, which may include one or more address fields, control fields and data, for example. A data block may be any unit of data or information bits.

For the purposes of the present disclosure, the term "server" is used herein to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present disclosure, a "computer network" should be understood to refer to a network that may couple devices (also referred to herein as "nodes") so that data communications may occur between devices, including between wireless devices coupled via a wireless network, for example. A network may also include mass storage, such as network attached storage (NAS), a storage area network (SAN), or other forms of computer or machine readable media, for example, and may include or be connected to a server. A network may include the Internet, one or more local area networks (LANs), one or more wide area networks (WANs), wire-line type connections, wireless type connections, cellular, such as carrier telephone lines, optical fibers, synchronous optical networks, synchronous digital hierarchy links, powerline communication links (e.g. IEEE 61334, IEEE P1901.2), Ethernet, Bluetooth, Bluetooth Low Energy (BLE) or Bluetooth Smart, WiFi or any connection based on a IEEE802.11x protocols, ZigBee or any connection based on the IEEE802.15.4 protocol, Z-Wave, 6 LowPAN (IPv6 Low-power wireless Personal Area Network), Thread, Sigfox, Neul, LoRa, any NFC connection, 2G (including GSM/GPRS/EDGE)/3G (including UMTS/HSPA)/4G (including LTE and LTE-Advanced)/5G cellular, or any combination thereof. Various types of devices, for example gateways, may be made available to provide an interoperable capability for differing architectures or protocols used in the network. Any number of nodes, devices, apparatuses, links, interconnections, etc. may be used in a computer network according to the present subject disclosure.

A communication link or channel may include, for example, analog telephone lines, full or fractional digital lines, wireless links including satellite links, or other communication links or channels, such as may be known to those skilled in the art.

It should be understood that embodiments of the present subject disclosure may be used in a variety of applications. Although the present subject disclosure is not limited in this respect, the method of managing a database and the method of managing a charge disclosed herein may be used in many apparatuses such as in any device having some computational power and configured to participate in transactions, including software transactions (e.g. transactions known as "smart contracts"), for example, computer program instructions which, when provided to a computer system comprising a processor and executed, cause said computer to perform a function related to a digital transaction. For clarity, the following description focuses on the context of peer-to-peer energy transfer transactions. However, technical features of the present subject disclosure are not limited thereto.

FIG. 1 shows an exemplary system (10) in which the system, computer program product, and method proposed in the present subject disclosure may be implemented.

The system (10) of FIG. 1 includes, without being limited to, a group of devices D1, D2, . . . , D6, (referred to as "community members" in the following) that require electric charge to function and able to provide an electric charge and participate in energy transfer transactions (referred to as "charging transactions" in the following) with other devices (11a and 11b) (referred to as "charge providers" in the following) to acquire charge.

Examples of devices include, but are not limited to, any device configured with a processing unit for providing computational power, and which may be involved in energy transfer transactions for collecting energy and/or providing energy, such as, electronic (including mobile) devices (smartphones, tablets, laptop computers, phablets, PDA devices, drones, cameras, etc.), electric vehicles (electric and/or hybrid cars, trucks, buses, delivery autonomous vehicles, scooters and bicycles), etc.

For clarity, the following description focuses on peer-to-peer electric charge transfer transactions between electric vehicles (also referred to herein as "V2V transactions"). However, technical features of the present subject disclosure are not limited thereto.

The group of devices D1, D2, D3, D4, D5, and D6 form a so-called charging device community (12), which in embodiments may be formed of a large number of connected electric devices, each with the capability to connect to a communication network (13) and having some computational power. Each of the devices D1-D6 may include a computer system (not shown on the figure) configured for performing computations upon request according to the consensus protocol provided herein. Typical community members may include (but are not limited to) electric cars, trucks, buses, delivery autonomous vehicles, scooters and bicycles.

The system (10) may be operated to provide a service to end users using community member devices, such as, for example, a peer-to-peer energy transaction service or a V2V charge service. Depending on the embodiment, such service may be provided by an energy distribution operator, acting as primary energy provider for providing energy to the community member devices, or by a broker, possibly independently from any primary energy provider, providing a service in association with one or more primary energy providers which may provide energy to the community member devices. As used herein a secondary energy provider will refer to an energy provider which is not a primary energy provider, such as, for example, a community member device or any vehicle device capable for providing energy to another device.

As shown on FIG. 1, a first charging point CP1 (11a) of the system (10) may be operated by a first primary energy provider (PEP1), while a second charging point CP2 (11b) of the system (10) may be operated by a second primary energy provider (PEP2).

The system (10) may use a registration/deregistration scheme through which device users may register their device(s) to belong to the charging device community (12) and use the proposed service. The charging device community (12) may then comprise registered devices, and information (such as login credentials, identification information, profile information, etc.) regarding each registered device may be stored in a database (not shown on the figure) of a server (14).

The system (10) may also include a user interface environment (not shown on the figure), for example through a mobile app and/or through a browser interface, for users to interact with various functions of the system (10) as part of the service provided thereby.

The system (10) may use different types of charge providers: A charge provider may be a device external to the charging device community (12) (D1, D2, D3, D4, D5, and D6), such as a charging point (11a, 11b), which provides charge but does not need to acquire it through the system (10). Any device in the charging device community (12), such as an electric vehicle that can provide charge but also needs to acquire it when necessary, may also operate as a charge provider in the system (10).

As used herein, an entity (which may be a primary energy provider, a secondary energy provider, a device (e.g. a vehicle device), including a community member device) which participates to the service provided to the community member devices will be referred to as a "participating entity," and an entity which does not participate to the service provided to the community member devices will be referred to as a "non-participating entity." For example, a primary energy provider may be a participating PEP or a non-participating PEP, depending on whether the PEP participates or not to the service provided to the community member devices. A secondary energy provider may be a participating secondary energy provider or a non-participating secondary energy provider, depending on whether the secondary energy provider participates or not to the service provided to the community member devices. For example, a device (e.g. an electric vehicle) which is not a community member device may in some embodiments be handled as a non-participating secondary energy provider.

An exchange of charge, whereby a community member (D2) acquires charge from a charging device (11a), may trigger at the charging device (11a) execution of a software entity for creating a set of data representing a corresponding charging transaction between the community member (D2) and the charging device (11a).

Depending on the type of charge provider device involved in the transaction, a charging transaction may include a transfer of charge, for example including to a vehicle from in-road inductive chargers, to a vehicle from "quick-clamp" wired chargers while stationary, or between two vehicles. The vehicles can also be moving and the charge can be done through a physical link with a car to car refuelling mechanism.

Each device (D1, D2, D3, D4, D5, and D6) of the charging device community (12) may be configured for data communication through the communication network (13) with a server (14), which is also communicatively connected to the communication network (13).

The charging device (for example the charging points 11a, 11b) will also typically include a computer system, configured for generating the set of data representing the charging transaction (referred to as "transaction data" in the following), and for transmitting such transaction data to the server (14), through the communication network (13).

In one or more embodiments, the transaction data for a P2P charging transaction (for example where the charging device is an electric vehicle) may comprise data identifying the charging device, and data representing an amount of charge provided by the charging device according to the transaction. The data identifying the charging device may comprise a registration identification data of the charging device as community member device registered in the system (10).

In some embodiments, the transaction data for a P2P charging transaction may further comprise data representing a maximum state of charge of the energy storage unit of the charging device once the charging transaction is completed.

In some embodiments, the transaction data for a P2P charging transaction may further comprise data identifying the charged device, in particular whenever the charged device is also a community member device.

In some embodiments, the transaction data for a P2P charging transaction may further comprise, for a community member device operating as charging device, a detailed state of charge, DSOC, data record of the energy storage unit of the community member device, comprising data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit.

The system (10) further includes a ledger (15) (referred to as "energy transfer ledger" in the following), which is a data record of charging transactions that have been verified prior to being added in the ledger using a consensus protocol. The energy transfer ledger (15) may be implemented as a blockchain storage system used to record the various charging transactions that occur between community members, and between community members and charge providers. Each charging transaction may be processed, included verified, to be added to the energy transfer ledger in a block (a "transaction block") through a device consensus verification process.

In one or more embodiments, the system (10) may be configured to execute a cohort selection algorithm through a cohort selection function (14a), transaction block creations through a transaction block creation function (14b), a device consensus algorithm through a device consensus function (14c), and a database management algorithm through a database management function (14d).

In one or more embodiments, the cohort selection function (14a) may be configured as a software entity, running on the server (14) in the exemplary embodiment shown on FIG. 1, executing a cohort selection algorithm which may be used to randomly select a subgroup of devices from the charging device community (12) (referred to as the "device cohort" in the following). The random selection of devices from the charging device community (12) advantageously ensures that the membership of a particular device cohort is impossible to predict, and is different each time a new device cohort is selected, that is, each time a new transaction block is to be added to the energy transfer ledger (15).

Depending on the embodiment, the members of the device cohort may be drawn from, for example, only those community members who have been active (i.e. taken part in a charging transaction) within a specified time period (e.g. one hour, one day), or, alternatively, all known community members.

In one or more embodiments, the transaction block creation function (14b) may be configured as a software entity, running on the server (14) in the exemplary embodiment shown on FIG. 1, executing a transaction block creation algorithm for compiling one or several Transaction Data Sets into one or several transaction blocks, further to the receiving the one or several Transaction Data Sets. That is, a transaction block may include several transaction data sets respectively corresponding to several charging transactions. Alternatively, the transaction block creation function (14b) may be configured so that a new transaction block is created for each new charging transaction.

In other embodiments, the transaction block creation function (14b) may be configured as one or more software entities, each configured to run on different platforms, such as a platform of a device of the charging device community (12), the server (14) platform, and/or a charge provider device plateform.

In some embodiments, the transaction block creation function (14b) may be configured to compile transaction blocks to include relevant identifying data, such as transaction value, transaction type, timestamp information for the transaction (e.g. date and time of the transaction), a geographical location for the transaction, and/or a charge provider party and/or a charge receiver party in the transaction.

In some embodiments, the transaction block creation function (14b) may be configured to compile multiple charging transactions into a single transaction block, which may or may not be related to each other by any of the above parameters.

In one or more embodiments, the device consensus function (14c) may also be configured as a software entity, running on the server (14) in the exemplary embodiment shown on FIG. 1, executing a device consensus algorithm for controlling the verifying of new transaction blocks prior to their insertion into the energy transfer ledger. In some embodiments, the control performed by the device consensus function (14c) may include the allocating respective subtasks to selected cohort devices (i.e. devices selected by the cohort selection function to be part of the device cohort), as described below in further details.

In one or more embodiments, the database management function (14d) may be configured as a software entity, running on the server (14) in the exemplary embodiment shown on FIG. 1, executing a database management algorithm which may be used to manage the database comprising the energy transfer ledger (15) in order to monitor charging transactions performed using charge(s) that may have been acquired from one or more primary energy providers.

In one or more embodiments, the charge management function (16) may be configured as a software entity, running on a user platform, such as a user device (e.g. a smartphone, a tablet, a computer executing a web browser, etc.) and/or directly on a community member device which is equipped with a user interface (including, for example, a graphical user interface).

In some embodiments, to achieve consensus, a plurality or all of the members of a device cohort, as defined by the cohort selection algorithm, may contribute to the completion of a verification task (the "work task"). The work task may be, for example, a calculation, or a processing job, such as analysis of a whole or portion of an image.

The contribution of each device of the device cohort will preferably be designed to be small so as to minimise the energy expenditure required per device. As a result, the device cohort may be dimensioned with a large number of members.

Compared to the POW consensus mechanism, the amount of work that is completed overall can advantageously be minimised, as the inherent security of the present system is generated through the participation of many devices in the consensus mechanism. The present subject disclosure therefore advantageously provides a new way of reaching a tradeoff between security and global energy consumption.

As the members of the device cohort may typically number in the thousands in embodiments, it is unlikely that a single entity may have control of sufficient cohort members to be able to create fraudulent transactions.

It will be appreciated by those having ordinary skill in the relevant art that any suitable (preferably large) number of community members may be used in place of the charging device community (12) used in FIG. 1 which is given by way of example only.

Figure 2:
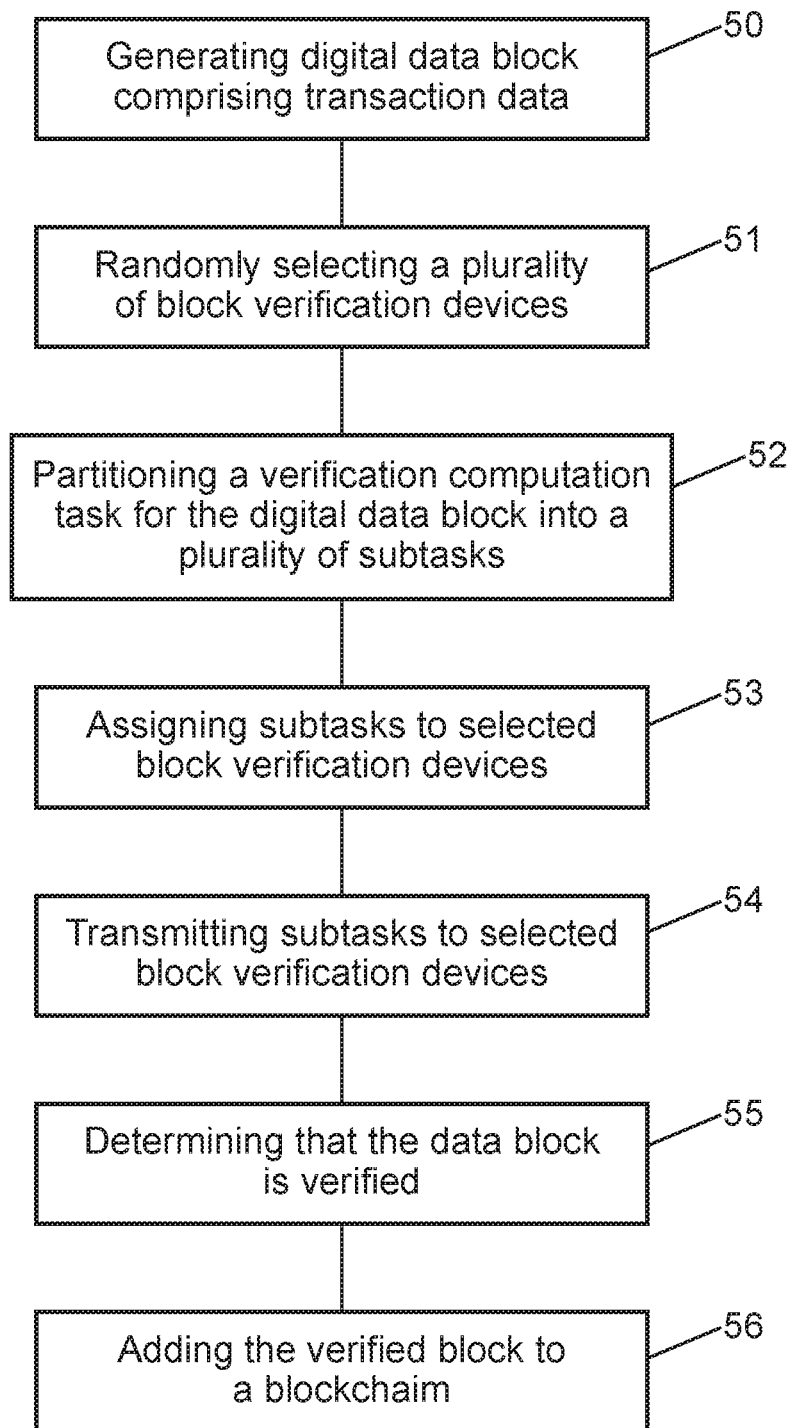
FIG. 2 is a block diagram illustrating a method of achieving consensus for the addition of a new block in a blockchain data set.

FIG. 2 illustrates a method of achieving consensus for the addition of a new block in the blockchain that may be used in one or more embodiments of the present subject disclosure.

As shown on FIG. 2, upon execution of an energy transfer transaction corresponding to an exchange of charge between a community member device and a charge source device, a digital data block comprising transaction data representing the energy transfer transaction is generated (50).

The digital data block needs to be verified prior to be inserted in a blockchain-enabled storage system, possibly after further processing other than for purposes of verification.

The proposed verification scheme includes a randomly selecting (51), in a group of community member devices, a plurality of block verification devices, wherein the block verification devices form a subgroup of block verification devices. In some embodiments, not all community member devices in a group of community member devices may qualify as a candidate block verification device, so that a group of community member devices may include a group of candidate block verification devices, and a random selection within the group of candidate block verification devices may result in selected candidate block verification devices forming a subgroup of the group of candidate block verification devices. In some embodiments, the group of community member devices may be composed of devices that require electric charge to function and/or are capable of providing electric charge to other devices. Further, each device of the group of community member devices may be configured to have the capability to connect to a computer network, and to include a computer system which is a node of the computer network.

The blockchain-enabled storage system may be configured so that the insertion of a new block into the blockchain may be conditioned to the new block being verified, or validated, through a verification protocol which may involve completing a work, that is, a computation task. According to the present subject disclosure, such a block verification computation task may be partitioned (52) into a plurality of block verification computation subtasks. As a consequence, the computation task may be shared among a plurality of block verification devices, each with its own computation capabilities, through the block verification computation subtasks.

Once the block verification computation subtasks determined through the partitioning of the block verification computation task, or as the block verification computation subtasks are determined, the block verification computation subtasks may be assigned (53) to respective selected block verification devices of the subgroup of block verification devices.

The digital data block may then be transmitted (54) to each selected block verification device, together with its respective block verification computation subtask over a computer network, and at least one set of block verification results may be received, that corresponds to one of the subtasks transmitted to the selected block verification devices.

As will be described below in further details, in one or more embodiments, the allocated subtasks will all result in a failure to determine a solution to the block verification computation task, except for one subtask which will result in a determined solution to the block verification computation task. In such case, it may only be necessary to obtain the successful result(s) that solve the block verification computation task, to make a determination that the digital data block is verified (55).

In other embodiments, respective block verification results may be received from each selected block verification device over the computer network.

Further to the receiving of the block verification results, whether such results are received from only one selected block verification device or from respective results are received from a plurality, possibly each, of the selected block verification devices, a determination (55) may be made that the block is verified.

The verified block may be added (56) to the blockchain-enabled storage system further to the determination that the block is verified.

In some embodiments, such determination may comprise a determination to decide whether or not the digital data block is verified, based on the received verification results. For example, the determining that the digital data block is verified, based on the received verification results may comprise in some embodiments a combining of the respective verification results to generate an aggregate verification result.

In the case where it is determined that the digital data block is verified, the verified block may be added to the blockchain-enabled storage system responsive to the determination.

FIG. 3a illustrates an exemplary architecture of a blockchain-enabled storage system which may be used in the proposed system, computer program product, and method of the present subject disclosure.

FIG. 3a shows a blockchain (100), that is, a set of data blocks which form a sequence of blocks stored as a ledger in a memory. New blocks are appended to the end of the sequence, and except for the first block (initial block, sometimes referred to as the "genesis block" of the blockchain) of the sequence, each block (100a, 100b, 100c, 100d) of the sequence includes a link to its parent block in the sequence. In the example illustrated on FIG. 3a, a genesis block (100a) is parent of a first block (100b), which is itself parent of a second block (100c), and the sequence of blocks continues until a nth block (100d), whose parent block is the n−1th block of the sequence.

Each block of the sequence may have a same data structure, and may include a header part (101a-101d) and a payload part (102a-102d). The coupling of a block to its parent block may be performed through a digital print (e.g. a hash value obtained as a result of a hash function (e.g. SHA-256) applied to data of the parent block) of data of the parent block (103b-103d) included in the header of the block.

Figure 3B:
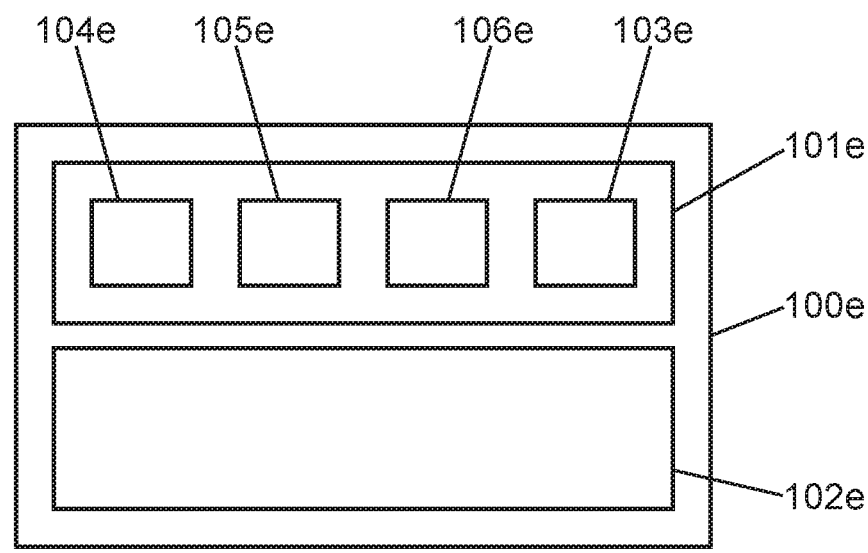
FIG. 3b shows an exemplary architecture of a block in a blockchain data set.

FIG. 3b illustrates in further details an exemplary architecture of a block which may be used in the proposed system, computer program product, and method of the present subject disclosure.

Shown on FIG. 3b is a block (100e) which comprises a header (101e) and a payload (102e), as described above with reference to FIG. 3a. The block header (101e) includes a digital print of data included in the parent block (103e) of the block (100e), a sequence number (104e) (also called "block height"), in the form of an integer value that represents the rank of the block (100e) in the sequence of blocks starting with a genesis block of predetermined rank (e.g. 0 or 1), each block bearing the sequence number of its parent block to which an increment value (e.g. 1) has been added, timestamp data (105e), which may be data representing a date and/or a time, expressed as a number of seconds elapsed as of a reference time (e.g. Jan. 1, 1970), a digital print (106e) of data included in the block, a nonce value (106e), in the form of a 4-byte field, which may be determined as part of the task work for verifying the block (100e).

The payload (102e) of the block (100e) may include transaction data, such as energy transfer transactions, between devices.

In one or more embodiments, the digital print function used for the blockchain may be a hash function, such as, for example a cryptographic hash function, which maps data of a block to a unique fixed-size hash value. A cryptographic hash function may advantageously be used as digital print function for the blockchain as it holds the following properties that are well suited for the design of a computationally expensive mathematical problem to be solved with respect to a new block: Cryptographic hash functions are deterministic, so the same message always results in the same hash. It is infeasible to generate a message from its hash value except by trying all possible messages, which represents a computationally very expensive task. Further, a small change to a message would change the hash value so extensively that the new hash value appears uncorrelated with the old hash value. Lastly, it is infeasible to find two different messages with the same hash value.

Examples of cryptographic hash function that may be used in embodiments of the present subject disclosure include MD5, the Secure Hash Algorithm family of functions SHA-1, the Secure Hash Algorithm family of functions SHA-2 (including SHA-256), the Secure Hash Algorithm family of functions SHA-3, RIPEMD-160, Whirlpool, and BLAKE2.

A device (e.g. a vehicle, or any electronic device operating with a rechargeable battery) may receive electrical charge from various sources and various technologies (contactless, by cable . . . ) during the course of its activity. Each exchange of charge may be defined as a transaction between the device and the charge source.

A data block may be formed based on each transaction, or on a plurality of transactions in which the device was involved, which must be verified before it is added to a blockchain-enabled transaction ledger.

The blockchain system may comprise a plurality of nodes of a computer network, each storing a copy of the blockchain.

Referring back to the exemplary system (10) of FIG. 1, some or all of the devices (D1-D6) registered as members of the charging device community (12) may be such nodes of the computer network that store a copy of the blockchain.

In some embodiments, only the devices members of the charging device community (12) registered with a profile indicating that they may be selected as member of a device cohort, may store a copy of the blockchain.

The addition of a new verified block to the blockchain-enabled transaction ledger may include the updating of each copy of the blockchain locally stored at a member of the charging device community (12) with the newly added block.

The consensus protocol used in blockchain systems aims at ensuring that ledger copies hold by a plurality of respective nodes are identical.

A work task, typically consisting in computer calculations, is designed to verify the block, and ensure that the device with the new block is not likely to attack the blockchain-enabled transaction ledger with a malicious block. In some embodiments, the task may comprise the calculation of a hash value of the data of the new block, to which the above-described nonce value has previously been added.

The hash value calculation may be performed using a cryptographic hash algorithm using iterations, with the nonce value being set to 0 at the first iteration, and being increased (e.g. incremented by a predetermined increment step) at each iteration. As discussed above with respect to the properties of the cryptographic hash functions, even a small change in the data block, such as the incrementing of the nonce, will result in a different hash value. The work task to be performed may therefore be seen as an inverse hash calculation, as it aims at determining the correct nonce value so that the hash computation result is less than a given threshold, called difficulty. The nonce may be increased at each hash calculation iteration, as long as the computation result is not smaller than the imposed difficulty.

The task is completed once a hash smaller than or equal to the imposed difficulty is calculated. The block with the determined nonce value may then be distributed to devices of the blockchain system so that the hash calculation can be validated.

In some embodiments, each block may be verified by a (typically large) randomly selected group of charging devices, before it can be added to the transaction ledger. The selected devices contribute to a work task (such as a calculation) to verify a block.

The blockchain-enabled transaction ledger (15) may be managed by a server (14), which may be implemented in a central manner or in a distributed manner (e.g. as cloud-based server).

In some embodiments, a transaction recorded in a block inserted in the blockchain of the blockchain-enabled transaction ledger (15) may be of a least two types: a first type of transaction wherein a community member device acquires charge from a charging point (P2V transaction), and a second type of transaction wherein a community member device acquires charge from another community member device (V2V transaction).

In one or more embodiments, a detailed state of charge (DSOC) data record is maintained for one or more community member devices comprising an energy storage unit (e.g. a battery).

In some embodiments, a DSOC data record of the energy storage unit of a community member device may comprise data representing a sequence of one or more subsequent charging transactions for transferring charge from a primary energy provider to the energy storage unit, data representing a maximum state of charge (SOCsup) of the energy storage unit, and, for each charging transaction, data representing an amount of charge acquired by the energy storage unit;

In some embodiments, a further detailed DSOC data record containing data representing a sequence of one or more subsequent charging transactions for transferring charge to the energy storage unit, including those charging transactions for transferring charge from a primary energy provider to the energy storage unit, may be obtained based on a DSOC data record as described above. The further detailed DSOC data record may include information related to a maximum state of charge (SOCsup) of the energy storage unit at a given time, as well as information related to one or more subsequent charging transactions during which the energy storage unit of the community member device received an electric charge, the combination of the received electric charges corresponding to the maximum state of charge (SOCsup). That is, the further detailed DSOC data record may provide information related to a maximum state of charge (SOCsup) of the energy storage unit at a given time $t_0$ (SOCsup($t_0$)), and information related to a history of the different charging transactions that led to the maximum state of charge SOCsup($t_0$).

A maximum state of charge at a given time $t_0$ (SOCsup($t_0$)) of the energy storage unit of the device may result from subsequent charging transactions, each of which may have involved a primary energy provider (PEP1, PEP2) participating to the service provided to the community member devices (hereinafter referred to as "participating primary energy provider"), a primary energy provider (X) which does not participate to the service provided to the community member devices (hereinafter referred to as "non-participating primary energy provider"), a secondary energy provider which does not participate to the service provided to the community member devices (e.g. in some embodiments an electric vehicle which is not a community member device) (hereinafter referred to as "non-participating secondary energy provider"), or a secondary energy provider which participates to the service provided to the community member devices (e.g. another community member device) (hereinafter referred to as "participating secondary energy provider").

Figure 4:
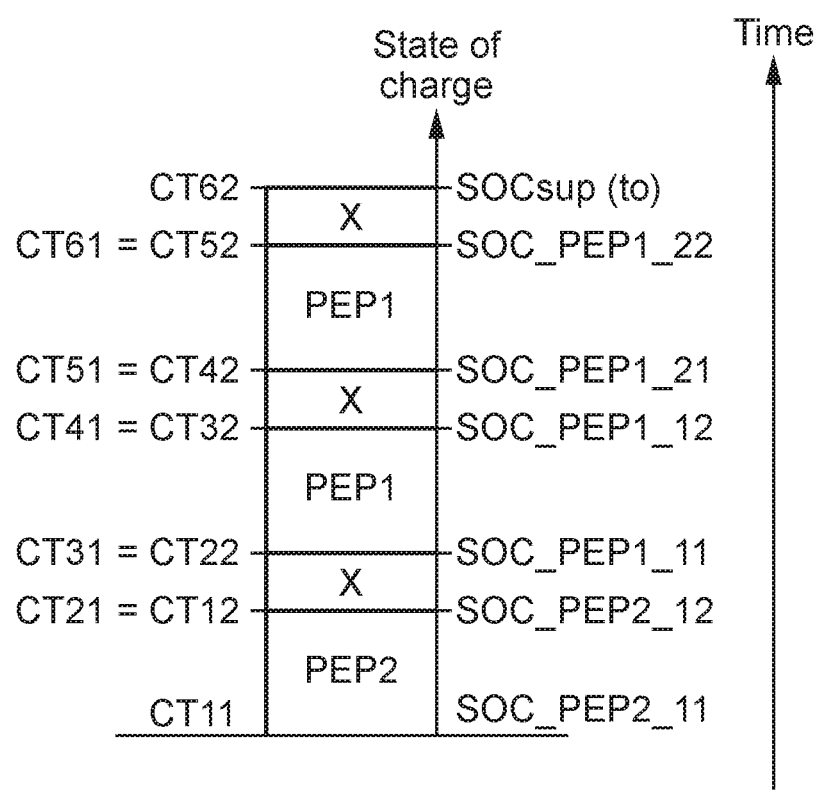
FIG. 4 shows an exemplary detailed state of charge (DSOC) data record for a device according to one or more embodiments.

FIG. 4 shows an exemplary DSOC for a device D, illustrated as a diagram showing different charging transactions that successively occurred in time.

The non-participating entities (non-participating primary energy providers and non-participating secondary energy providers) are referred to as "X" entities on FIG. 4, and are not distinguished from one another. According to embodiments of the present subject disclosure, only transactions involving participating entities as charging entities may be tracked by the proposed system, and a further detailed DSOC for a given device, as illustrated on FIG. 4, may be generated based on a DSOC data record obtained from data stored in the blockchain.

In the following, the charge level of the energy storage unit of the device D for a charging transaction i will be referred to as CTi1 at the start of the charge, and as CTi2 at the end of the charge. A lth charging transaction during which the device D received energy from a charging point operated by a primary energy provider PEPk will be referred to as SOC_PEPk_l, and the charge levels at the start (respectively the end) of the transaction will be referred to as SOC_PEPk_l1, and SOC_PEPk_l2, respectively As shown on FIG. 4, a first charging transaction CT1 wherein the device D received charge from a participating PEP (PEP2) first occurred in time. This first charging transaction (oldest in time) is the first charging transaction with PEP2 in the charge history provided by the illustrated DSOC, and is referred to as SOC_PEP2_1, and the charge levels at the start (respectively the end) of the transaction are referred to as SOC_PEP2_11, and SOC_PEP2_12, respectively. The amount of charge received in connection with this transaction is illustrated on FIG. 4 by a lowest charge level for the transaction labelled SOC_PEP2_11 (start of charge) and a highest charge level for the transaction labelled SOC_PEP2_12 (end of charge). Referring to the corresponding charging transaction, such amount of charge is also illustrated by the charge level at the start of the charge CT11 and the charge level at the end of the charge CT12. Therefore the amount of charge $\Delta Q(CT1)=\Delta Q(SOC\_PEP2\_1)$ received during this transaction may be represented by the difference between the charge level at the end of the charging transaction and the charge level at the start of the transaction:

$$\Delta Q(CT1)=\Delta Q(SOC\_PEP2\_1)=CT12-CT11=SOC\_PEP2\_12-SOC\_PEP2\_11.$$

A second charging transaction CT2, subsequent to the first charging transaction CT1, wherein the device D received charge from a non-participating charging point (represented as "X" on the figure), added some charge to the previous highest charge level CT21=CT12=SOC_PEP2_12. The amount of charge $\Delta Q(CT2)$ received during this transaction CT2 may be represented by the difference between the charge level at the end of the charging transaction and the charge level at the start of the transaction:

$$\Delta Q(CT2)=CT22-CT21=CT22-CT12.$$

A third charging transaction CT3, subsequent to the second charging transaction CT2, wherein the device D received charge from a participating PEP (PEP1), added some charge to the previous highest charge level CT31=CT22. This third charging transaction is the first charging transaction with PEP1 in the charge history provided by the illustrated DSOC, and is referred to as SOC_PEP1_1, and the charge levels at the start (respectively the end) of the transaction are referred to as SOC_PEP1_11, and SOC_PEP1_12, respectively. The amount of charge received in connection with this transaction is illustrated on FIG. 4 by a lowest charge level for the transaction labelled SOC_PEP1_11 (start of charge) and a highest charge level for the transaction labelled SOC_PEP1_12 (end of charge). Referring to the corresponding charging transaction CT3, such amount of charge is also illustrated by the charge level at the start of the charge CT31 (CT31=CT22) and the charge level at the end of the charge CT32. Therefore the amount of charge $\Delta Q(CT3)=\Delta Q(SOC\_PEP1\_1)$ received during this transaction may be represented by the difference between the charge level at the end of the charging transaction and the charge level at the start of the transaction:

$$\Delta Q(CT3)=\Delta Q(SOC\_PEP1\_1)=CT32-CT31=SOC\_PEP1\_12-SOC\_PEP1\_11.$$

As CT31=CT22, and CT12=CT21, data related to the second transaction (with a non-participating entity) may be generated based on data related to the first and third transactions, which both occurred with a participating entity. This may allow in some embodiments generating a detailed DSOC as illustrated by FIG. 4 based on a DSOC comprising transaction-related data that is only related to transactions for charge of the device from a participating entity.

A fourth charging transaction CT4, subsequent to the third charging transaction CT3, wherein the device D received charge from a non-participating charging point (represented as "X" on the figure), added some charge to the previous highest charge level CT41=CT32=SOC_PEP1_12. The amount of charge $\Delta Q(CT4)$ received during this transaction CT4 may be represented by the difference between the charge level at the end of the charging transaction and the charge level at the start of the transaction:

$$\Delta Q(CT4)=CT42-CT41=CT42-CT32.$$

A fifth charging transaction CT5, subsequent to the fourth charging transaction CT4, wherein the device D received charge from the participating PEP PEP1, added some charge to the previous highest charge level CT51=CT42. This fifth charging transaction is the second charging transaction with PEP1 in the charge history provided by the illustrated DSOC, and is referred to as SOC_PEP1_2, and the charge levels at the start (respectively the end) of the transaction are referred to as SOC_PEP1_21, and SOC_PEP1_22, respectively. The amount of charge received in connection with this transaction is illustrated on FIG. 4 by a lowest charge level for the transaction labelled SOC_PEP1_21 (start of charge) and a highest charge level for the transaction labelled SOC_PEP1_22 (end of charge). Referring to the corresponding charging transaction CT5, such amount of charge is also illustrated by the charge level at the start of the charge CT51 (CT51=CT42) and the charge level at the end of the charge CT52. Therefore the amount of charge $\Delta Q(CT5)=\Delta Q(SOC\_PEP1\_2)$ received during this transaction may be represented by the difference between the charge level at the end of the charging transaction and the charge level at the start of the transaction:

$$\Delta Q(CT5)=\Delta Q(SOC\_PEP1\_2)=CT52-CT51=SOC\_PEP1\_22-SOC\_PEP1\_21.$$

A sixth charging transaction CT6, subsequent to the fifth charging transaction CT5, wherein the device D received charge from a non-participating charging point (represented as "X" on the figure), added some charge to the previous highest charge level CT61=CT52=SOC_PEP1_22. The amount of charge $\Delta Q(CT6)$ received during this transaction CT6 may be represented by the difference between the charge level at the end of the charging transaction and the charge level at the start of the transaction:

$$\Delta Q(CT6)=CT62-CT61=CT62-CT52.$$

At the end of the charge of the sixth charging transaction, the charge level CT62 reached the maximum state of charge at time $t_0$ (SOCsup($t_0$)) of the energy storage unit of the device.

As SOCsup($t_0$)>CT52, data related to the sixth transaction (with a non-participating entity) may be generated based on data related to the fifth transaction, which occurred with a participating entity, and the value of SOCsup($t_0$). This may allow in some embodiments generating a detailed DSOC as illustrated by FIG. 4 based on a DSOC comprising transaction-related data that is only related to transactions for charge of the device from a participating entity.

Therefore the detailed DSOC shown on FIG. 4 illustrates that this maximum state of charge at time $t_0$ (SOCsup($t_0$)) was reached through a sequence in time of 6 charging transactions, the first one being with PEP PEP2, the third and fifth one being with PEP PEP1, and the second, fourth and sixth one being with a non-participating charging point. The exemplary DSOC illustrated on FIG. 4 also advantageously provides information related to the amount of charge $\Delta Q(CTi)$ obtained by the device for each of the six charging transactions (CTi, i=1, ..., 6), so that $SOCsup(t_0)=\sum_{i=1}^{6}\Delta Q(CTi)$, which may in some embodiments be obtained from the maximum state of charge at time $t_0$ (SOCsup($t_0$)), and information related to the amount of charge $\Delta Q(CTi)$ obtained by the device for each charging transaction with a participating entity (CTi, i=1,3,5).

Figure 5:
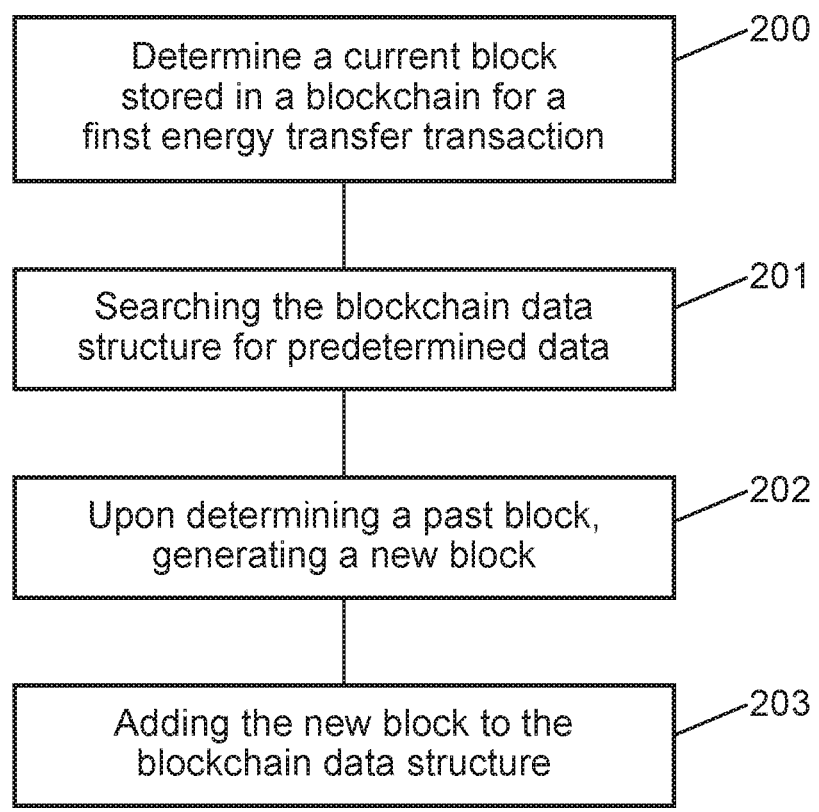
FIG. 5 is a block diagram illustrating a method of managing a database according to one or more embodiments.

FIG. 5 illustrates a method of managing a database according to one or more embodiments of the present subject disclosure.

As shown on FIG. 5, a current block stored in a blockchain data structure stored in the database may first be determined (200) in some embodiments, which current block comprises data related to a first energy transfer transaction for transferring energy from a community member device.

In some embodiments, this determination may be performed upon completion of the first energy transaction, further to the detection that a new block comprising transaction data related to the first energy transaction has been inserted in the blockchain.

Further to the determination of the current block, in some embodiments a search may be conducted (201) in blocks of the blockchain data structure for predetermined data indicating an energy transfer from at least one energy provider device controlled by an energy provider (e.g. a PEP) to the community member device. In some embodiments, the search may target predetermined data indicating an energy transfer from at least one energy provider device controlled by a participating energy provider (e.g. a participating PEP) to the community member device.

The charging transaction history for the community member device that is stored in the blockchain may therefore advantageously be searched for predetermined data indicating an energy transfer from at least one energy provider device controlled by an energy provider to the community member device, for example for information related to a previous charging transaction whereby the community member device received energy from a PEP.

In one or more embodiments, the predetermined data may comprise a detailed state of charge, DSOC, data record of an energy storage unit of the community member device, which comprises data representing a sequence of one or more subsequent charging transactions for transferring charge from the primary energy provider to the energy storage unit, data representing a maximum state of charge of the energy storage unit, and, for each charging transaction, data representing an amount of charge acquired by the energy storage unit.

In order to search the charging transaction history for the community member device, the search may advantageously be performed in some embodiments on blocks of a search block set in the blockchain data structure. Depending on the embodiment, the search block set may or not include the current block.

In some embodiments, the search block set may be chosen so that each block of the search block set other than the current block precedes the current block in the blockchain data structure. That is, each block of the search block set is the parent block or a grand-parent block with respect to the current block. Said otherwise, each block of the search block set has a timestamp which correspond to a time earlier than that corresponding to the timestamp of the current block.

In some embodiments, upon determining in the blockchain data structure at least one block containing the predetermined data (which at least one block may include in some embodiments the current block (as included in the search), and/or blocks preceding the current block), a new block may be generated (202) with data corresponding to a current reward transaction between the energy provider and the community member, based on data of the at least one block and data of the current block.

In some embodiments, the search may be configured to be stopped upon the first determining in the blockchain of a block containing the predetermined data. The search may be conducted as a sequential search, starting from the current block or, depending on the embodiment, a block parent to the current block, and stopping upon determining a block containing the predetermined data.

For example, the transaction data of the new block to be generated may be determined based on respective amount(s) of energy transferred from the primary energy provider to the community member device, and/or respective amount(s) of energy transferred from the community member device.

In some embodiments, the search performed on the search block set may be configured so that it determines at least one second block, possibly other than the current block, containing data related to at least one second energy transfer transaction for transferring charge from the community member device. In such cases, the new block may be generated based on data of the at least one second block.

In cases where the search in the blockchain leads to the determining in the blockchain of a plurality of blocks containing the predetermined data, the generating of the new block may in some embodiments be based on data of the plurality of blocks. For example, as discussed above in reference with FIG. 4, the transaction history of a device may include for a current state of charge of the device one or more transactions with one or more primary energy providers (PEP1 and PEP2). The generation of the new block may be based on several subsequent transactions whereby the device received charge from a primary energy provider.

Once generated, the new block may be inserted (203) in some embodiments in the blockchain data structure.

For example, the insertion of the new block in the blockchain may be performed according to the consensus protocol disclosed in the present subject disclosure. It will be appreciated by those having ordinary skill in the relevant art that any suitable consensus protocol or mechanism for inserting the new block in a blockchain may be used in place of the protocol and mechanism described herein, which is given by way of example only.

Referring back to FIG. 1, the determination of the current block, the searching the blocks of the blockchain data structure may be performed in some embodiments by the database management function (14d) executed by the server 14 of the system 10. The generation of the new block and insertion of the new block in the blockchain may be performed in some embodiments by the cohort selection function (14a), the block creation function (14b), and/or the device consensus function (14c) executed in the system 10.

In one or more embodiments, the search conducted in blocks of the blockchain data structure for predetermined data indicating an energy transfer from at least one energy provider device controlled by an energy provider to the community member device may be considered completed once a detailed state of charge data record for the community member device is obtained.

In one or more embodiments, the determining the current block may further comprise, according to the present subject disclosure, the receiving, from the community member device, of a DSOC data record of its energy storage unit, the DSOC data record comprising data representing a sequence of one or more subsequent charging transactions for transferring charge from a primary energy provider to the energy storage unit, data representing a maximum state of charge of the energy storage unit, for each charging transaction, data representing an amount of charge acquired by the energy storage unit, and information related to an amount of charge transferred from the energy storage unit of the community member device to the charged device.

Further to the receiving of the DSOC data record of the device, the current block to be inserted in the blockchain data structure may be generated, based on the DSOC data record, such current block comprising transaction data related to a charging transaction corresponding to an energy transfer between the community member device and a charged device for transferring charge from the energy storage unit of the community member device to the charged device.

In this manner, the performance of a charging transaction whereby a community member device provides charge to another device may be recorded in the blockchain data structure with a DSOC data record so that the search among blocks of the blockchain may advantageously be streamlined to a search in the current block.

In these embodiments, the search block set may include the current block, and may in some embodiments be limited to the current block.

In one or more embodiments, the search block set may be chosen as comprising a predetermined number of successive blocks of the blockchain, each block of the search block set other than the current block preceding the current block in the blockchain. In this manner, the search may advantageously be limited to a maximum number of searched block, in order to control the amount of computational resources dedicated to the search.

The search may also in some embodiments be performed using a blockchain sequential search loop, wherein each iteration of the loop comprises: searching for the predetermined data in a payload part of a current search block immediately following in the blockchain a previous search block processed during an immediately preceding iteration of the loop, wherein, depending on the embodiment, the loop is initialized with the current block or with the current search block immediately preceding the current block in the blockchain.

In one or more embodiments, a DSOC data record may be generated for each eligible charging transaction through which the community member device receives energy.

In some embodiments, each charging transaction through which the community member device receives energy may be eligible.

In other embodiments, eligible charging transactions may be charging transactions through which the community member device receives energy from a participating energy provider, which may be a participating primary energy provider or a participating secondary energy provider. In such cases, a DSOC data record may be generated only for eligible charging transaction.

In yet other embodiments, eligible charging transactions may be charging transactions through which the community member device receives energy from a participating primary energy provider. In such cases, a DSOC data record may be generated only for eligible charging transaction.

In some embodiments, the generation of the DSOC data record corresponding to a current charging transaction $CT_i$ may comprise the updating of a previous DSOC data record generated for an immediately preceding charging transaction $CT_{i-1}$ in a discrete-time sequence $\{CT_i\}_{i=1 \ldots N}$ of eligible charging transactions through which the community member device received energy, as illustrated on FIG. 4.

For example, referring back to FIG. 4, a DSOC data record may have been generated for each of the charging transactions with a participating entity illustrated on FIG. 4 ($CT_i$, i=1,3,5). Further, each of these three DSOC data record may have been generated based on the DSOC data record generated for the charging transaction preceding immediately the charging transaction for which the DSOC data record was generated.

The DSOC data record of a device may be stored in some embodiments as transaction data in the payload of a block stored in the blockchain data structure, the transaction data representing a charging transaction in which the device received charge. Such transaction data transaction data corresponding to the charging transaction may be stored in a block of the blockchain data structure, copies of which may be held by a plurality of community member devices as well as in a blockchain management server (e.g. the server (14) in the system architecture illustrated on FIG. 1). In such case, retrieval of a DSOC data record for a charging transaction of the device immediately preceding a current charging transaction may involve a searching in the blockchain data structure of a block preceding a current block containing transaction data comprising a DSOC data record for the device.

In some embodiment, the timestamp information stored in each block stored in the blockchain data structure may be used to search the most recently preceding in time block containing a DSOC data record for the community member device.

In one or more embodiments, a DSOC data record may be generated based on transaction data history stored in the blockchain data set.

For example, a search performed in blocks stored in the blockchain preceding a current block for predetermined data that comprises identification information of one or more entity (e.g. one or more participating PEP), and transaction type information indicating a type of transaction for transferring charge provided by the one or more entity to the device, may lead to the generation of data representing a history of eligible transactions whereby the device acquired charge from one or more entity (e.g. one or more participating PEP).

In some embodiments, the predetermined data may further comprise, for each identified transaction whereby the device acquired charge from an entity (e.g. a participating PEP), an amount of charge acquired from the entity pursuant to the transaction.

The timestamp information provided with the block stored in the blockchain may be used to reconstruct a time history of charging transactions or, depending on the embodiment, eligible charging transactions, whereby the device acquired charge (e.g. from a participating PEP).

Figure 6:
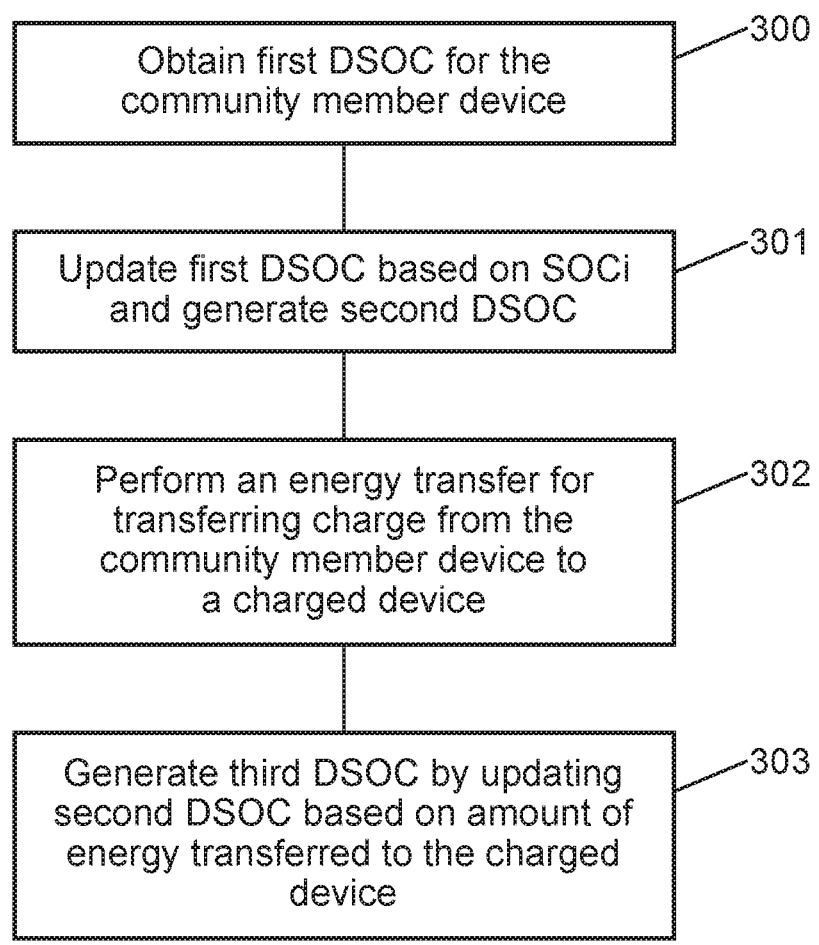
FIG. 6 is a block diagram illustrating a method of managing a charge of a device according to one or more embodiments.

FIG. 6 illustrates a method of managing a charge of an energy storage unit of a community member device according to one or more embodiments of the present subject disclosure.

Before performing an energy transfer corresponding to an energy transfer transaction with a charged device for transferring charge from its energy storage unit to the charged device, a community member may update its DSOC data record, so that such data record my accurately reflect its state of charge shortly before the transaction is performed.

In some embodiments, a first DSOC data record for the community member device may be obtained (300). As described above, the first DSOC data record may comprise data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit. For example, the first DSOC may correspond to the DSOC illustrated on FIG. 4 and described above.

In one or more embodiments, the first DSOC data record may be obtained by searching blocks of a blockchain data structure for determining a most recent block containing a DSOC data record for the community member device.

The first DSOC data record may be updated (301), based on a current state of charge (SOCi) of the energy storage unit.

The current state of charge SOCi may be obtained by measuring the state of charge, i.e. the charge level, of the energy storage unit prior to (preferably immediately or shortly before) the updating of the DSOC data record.

The current state of charge may reflect one or more charges of the energy storage unit that occurred since the DSOC data record last generated for the community member device, and one or more discharges of the energy storage unit corresponding to uses of energy for the operation of the community member device (for example discharges occurring when an electrical vehicle is running on electrical energy).

In one or more embodiments, the current state of charge SOCi may be measured at each occurrence of fulfillment of predefined SOCi measurement conditions, and stored in a memory. In some embodiments, the SOCi stored in memory may be updated upon a new measurement of the SOCi.

The SOCi may be stored in any suitable memory from which it can be retrieved for purposes of updating a DSOC data record. For example, the SOCi of a community member device may be stored in a memory of the community member device, in a memory associated with a software application executable on a computer platform such as a mobile phone, a tablet, a browser, etc., and/or in a memory managed by a server providing V2V charge management.

In one or more embodiments, the SOCi of a community member device may be updated further to each charge or discharge of the energy storage unit of the community member device (e.g. further to a V2V transaction, or prior to the stopping of an electrical vehicle).

The SOCi may be different from the maximum state of charge (SOCsup) of the energy storage unit recorded in the last stored DSOC data record, as one or more charge and/or discharge events may have occurred since the last stored DSOC data record, which may not have been handled as a charging transaction for which a DSOC data record would be generated, and therefore may not have been recorded in the last stored DSOC data record. For example, discharge of the battery when a electric or hybrid vehicle is running, charge of the energy storage unit with a device which is not a community member device are discharge and charge events that would not lead to the generating of a DSOC data record.

Once the second DSOC data record has been generated by updating the first DSOC data record based on the SOCi of the community member device, an energy transfer corresponding to an energy transfer transaction for transferring charge from the energy storage unit of the community member device to a charged device may be performed (302).

Further to the completion of the energy transfer (for example as reflected by the completion of the corresponding energy transfer transaction and the subsequent insertion of a block comprising transaction data related thereto in the blockchain data structure), a third DSOC data record may be generated (303) by updating the second DSOC data record, based on an amount of charge transferred from the energy storage unit of the community member device to the charged device during the energy transfer.

The charged device may or may not be a community member device. In the case where the charged device is a community member device, the method of managing a charge of an energy storage unit of a community member device of the present subject disclosure, for example as illustrated on FIG. 6, may be performed at the charged device, so that it may be used by both the charging device and the charged device.

In some embodiments, the third DSOC data record may be transmitted to a server for the generation, based on the third DSOC data record, of a block to be inserted in a blockchain data structure and comprising transaction data related to a charging transaction corresponding to the energy transfer. The transaction data of the new block may comprise the third DSOC data record.

In the following, the generating the second DSOC data record by updating the first DSOC data record according to embodiments of the present subject disclosure is described in further details, and illustrated by FIGS. 7a and 7b.

Figure 7A:
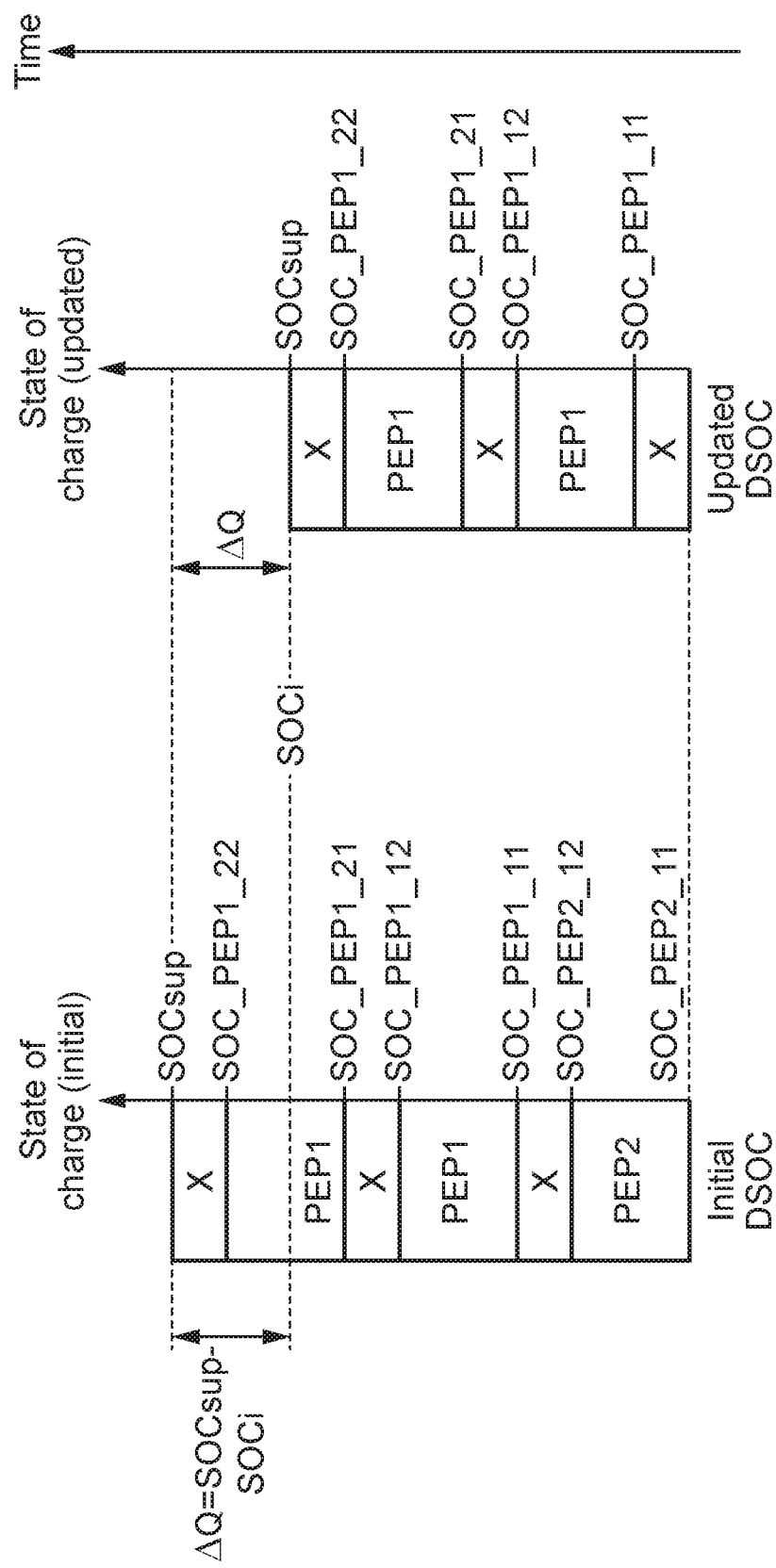
FIGS. 7a and 7b illustrate a method of updating a DSOC data record according to one or more embodiments.
Figure 7B:
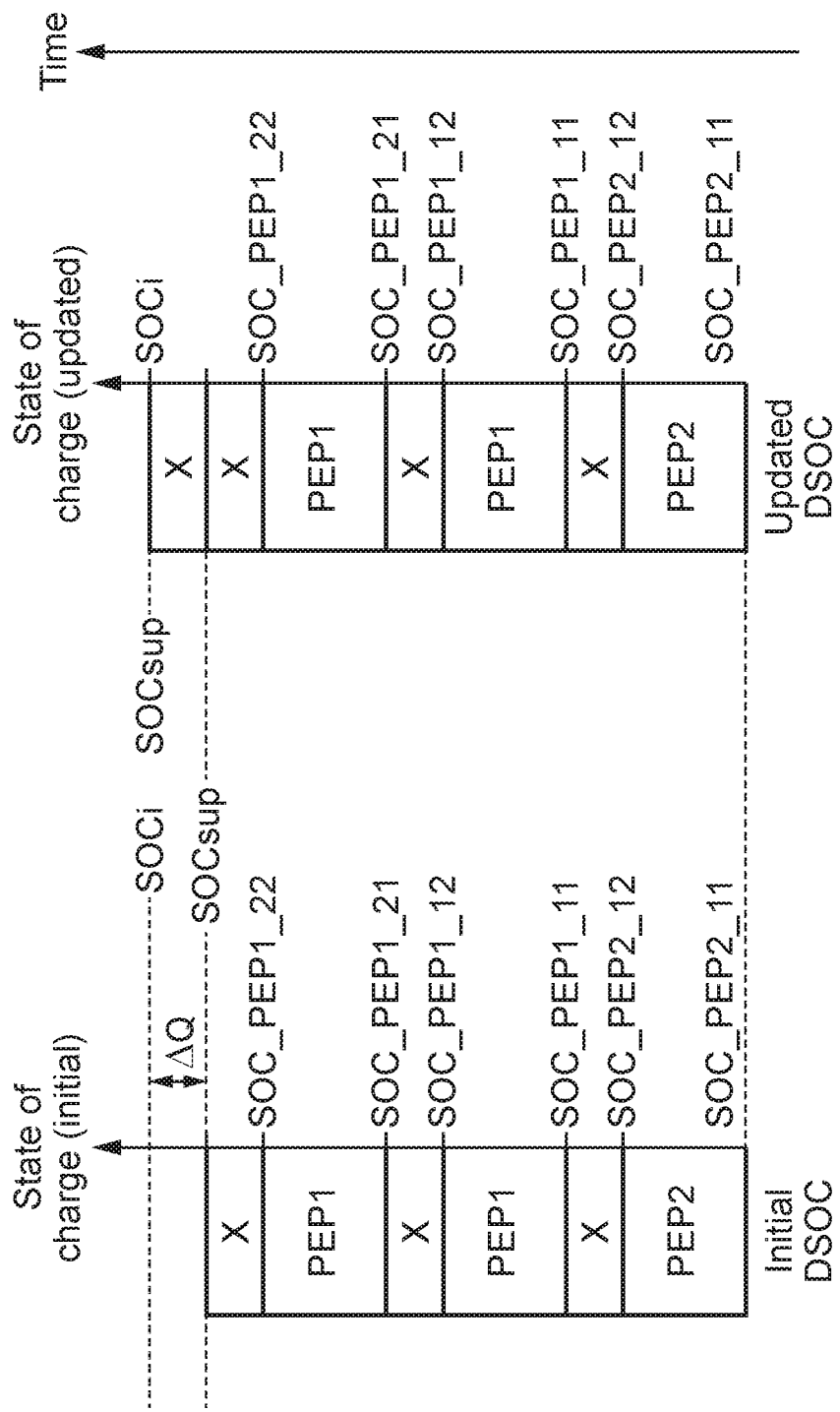

FIGS. 7a and 7b illustrate a method of updating a DSOC data record of a community member device according to one or more embodiments of the present subject disclosure.

In one or more embodiments, the DSOC data record to be updated comprises data representing a sequence of one or more subsequent charging transactions for transferring charge from at least one primary energy provider to the energy storage unit of the community member device, data representing a maximum state of charge (SOCsup) of the energy storage unit, and, for each charging transaction, data representing an amount of charge acquired by the energy storage unit.

Based on data included in the DSOC data record, a complete time sequence of subsequent charging transactions for transferring charge to the energy storage unit of the community member device leading to the maximum state of charge (SOCsup) of the energy storage unit, with for each charging transaction, data representing an amount of charge acquired by the energy storage unit, may be obtained.

The DSOC of the community member device may be updated based on the current state of charge (SOCi) of the energy storage unit of the community member device.

Assuming that the maximum state of charge (SOCsup) of the energy storage unit comprised in the DSOC data record is different from the current state of charge (SOCi) of the energy storage unit, two situations may be encountered: SOCsup<SOCi, and SOCsup>SOCi.

FIG. 7a illustrates a method of updating a DSOC data record of a community member device according to one or more embodiments of the present subject disclosure in a case where SOCsup>SOCi.

In such a case, it may be assumed that the community member device has consumed more charge than it has acquired. That is, the amount(s) of charge used (through operating the community member device and/or charging other devices) is larger than the amount(s) of charge acquired through various charging transactions. The charge reserve recorded in the DSOC data set has been consumed, as SOCi<SOCsup.

In one or more embodiments, the DSOC is updated according to a FIFO (First-In-First-Out) stack management scheme: a quantity of energy equal to a difference between SOCsup and SOCi is deleted from the DSOC data set, starting from the first, that is, the earliest transaction(s) of the complete time sequence for the community member device.

As illustrated on FIG. 7a, a complete time sequence corresponding to the one shown on FIG. 4, has been obtained for the community member device, that shows that the maximum charge SOCsup of the energy storage unit of the community member device was reached further to six consecutive (in time) charging transactions, among which a first charging transaction with a first participating primary energy provider PEP1, second, fourth, and sixth charging transactions with one or more non-participating entities, and third and fifth charging transactions with a second participating primary energy provider PEP2.

Also shown on the complete time sequence of FIG. 7a is the SOCi charge level based on which the initial complete time sequence (left handside of FIG. 7a) is updated.

On the right handside of FIG. 7a is shown the complete time sequence after the updating.

As can be seen on FIG. 7a, the stack of subsequent charges constituting the initial complete time sequence has been emptied out starting from the bottom of the stack, hence managed according to a FIFO stack management. The quantity of charge taken out from the bottom of the stack corresponds to $\Delta Q = SOCsup - SOCi$, so that the updated maximum state of charge (SOCsup) of the energy storage unit is equal to SOCi.

In the example of FIG. 7a, the first (earliest) charging transaction (with the second primary energy provider PEP2), and part of the second (second earliest) charging transaction (with an unknown energy provider X) have been deleted from the initial complete time sequence, and the indices representing an amount of charge acquired by the energy storage unit (start of charging transaction level and end of charging transaction level) have been updated accordingly.

FIG. 7b illustrates a method of updating a DSOC data record of a community member device according to one or more embodiments of the present subject disclosure in a case where SOCsup<SOCi.

In such a case, it may be assumed that the community member device has acquired more charge than it has consumed. That is, the amount(s) of charge acquired through various charging transactions is larger than the amount(s) of charge used (through operating the community member device and/or charging other devices). The charge reserve recorded in the DSOC data set has not been consumed, as SOCi>SOCsup.

In one or more embodiments, the DSOC is updated by adding on top of the charge stack a quantity of energy equal to a difference between SOCi and SOCsup, that is, after the latest transaction of the complete time sequence for the community member device.

As illustrated on FIG. 7b, a complete time sequence corresponding to the one shown on FIG. 4, has been obtained for the community member device, that shows that the maximum charge SOCsup of the energy storage unit of the community member device was reached further to six consecutive (in time) charging transactions, among which a first charging transaction with a first participating primary energy provider PEP1, second, fourth, and sixth charging transactions with one or more non-participating entities, and third and fifth charging transactions with a second participating primary energy provider PEP2.

Also shown on the complete time sequence of FIG. 7b is the SOCi charge level based on which the initial complete time sequence (left handside of FIG. 7b) is updated.

On the right handside of FIG. 7b is shown the complete time sequence after the updating.

As can be seen on FIG. 7b, the stack of subsequent charges constituting the initial complete time sequence has increased from the top with an additional charge corresponding to the difference between SOCi and SOCsup, that is, $\Delta Q = SOCi - SOCsup$, so that the updated maximum state of charge (SOCsup) of the energy storage unit is equal to SOCi.

In the example of FIG. 7b, a seventh, latest, charging transaction (with a non-participating energy provider X) have been recorded in the DSOC data record, immediately following in time the sixth charging transaction, also with a non-participating energy provider X. No update is performed on the indices representing an amount of charge acquired by the energy storage unit (start of charging transaction level and end of charging transaction level).

Figure 8:
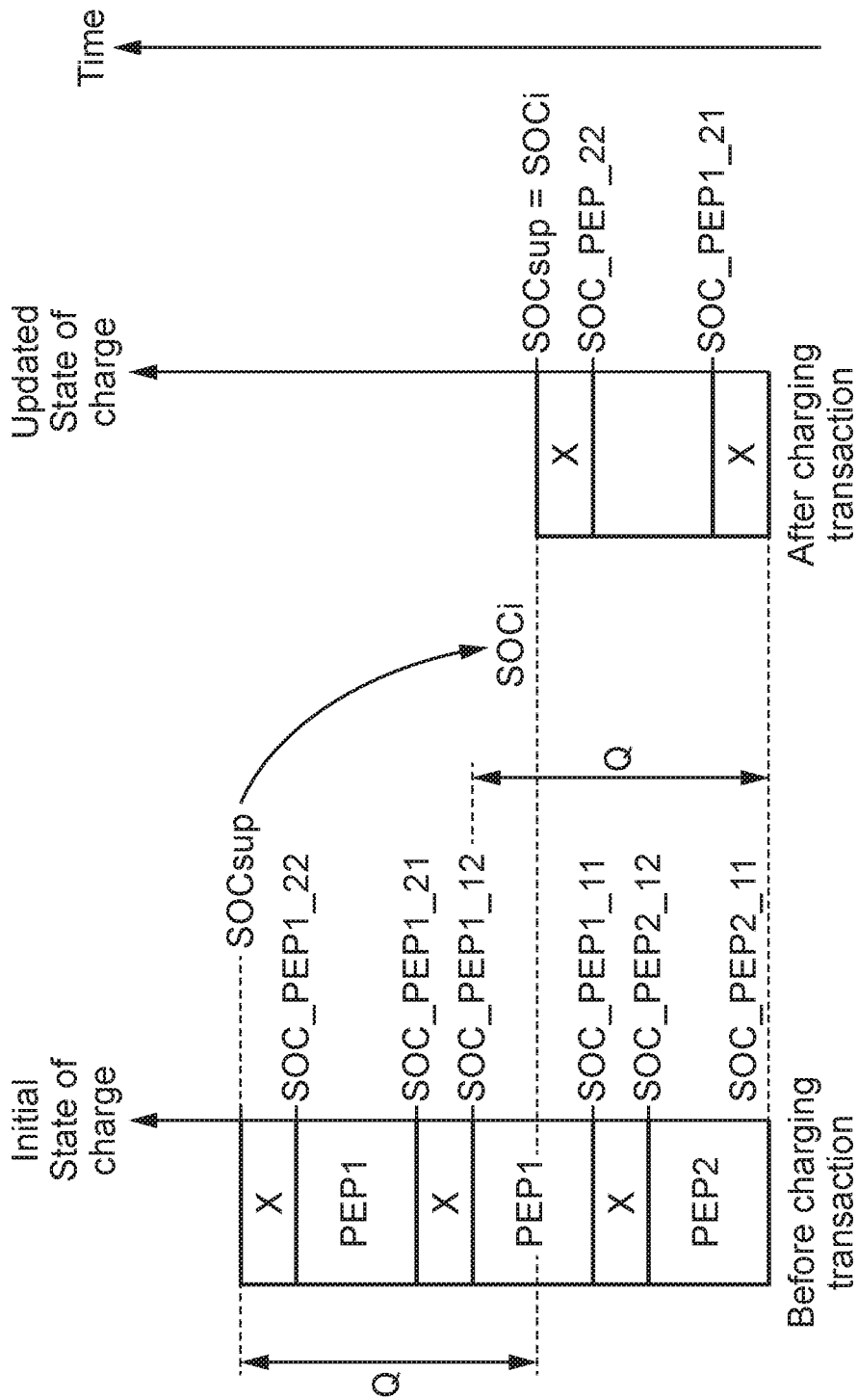
FIG. 8 illustrates the changes occurring in the state of charge of the energy storage unit of a community member device during performance of an energy transfer in accordance with one or more embodiments.

FIG. 8 illustrates the changes occurring in the state of charge of the energy storage unit of a community member device during performance of an energy transfer with a charged device for transferring a charge Q from the energy storage unit to the charged device.

The transferred charge Q may be expressed as a relative measurement (% of charge of the energy storage unit) or in KWh (Kilowatt per hour) units, and determined as a difference between charge levels before and after the charge transfer.

The charge device may be connected to the community member device (charging device), and the users of each device may agree on a transfer of Q KWh from the charging device to the charged device.

Assuming that the charge transfer proceed until completion, and assuming an ideal charging efficiency (in practice the charge amount taken out from the energy storage unit may be slightly higher than Q), the charge level of the energy storage unit will decrease by a charge amount substantially equal to Q. FIG. 8 shows the update of the maximum state of charge (SOCsup) from an initial level before the charge to an updated level (SOCsup=SOCi) once the charge is completed.

As illustrated on FIG. 8, a complete time sequence corresponding to the one shown on FIG. 4, has been obtained for the community member device, that shows that the maximum charge SOCsup of the energy storage unit of the community member device was reached further to six consecutive (in time) charging transactions, among which a first charging transaction with a first participating primary energy provider PEP1, second, fourth, and sixth charging transactions with one or more non-participating entities, and third and fifth charging transactions with a second participating primary energy provider PEP2.

Once the charge transfer is completed, the DSOC data record may be updated in a FIFO-based manner as illustrated in FIG. 7a. In the example illustrated on FIG. 8, the transferred charge amount will be composed of all the charge acquired from the first charging transaction with PEP2, all the charge acquired from the second charging transaction with a non-participating entity, and all of the charge acquired from the third transaction with PEP1 (first charging transaction with PEP1).

In one or more embodiments, a reward may be calculated and provided to the device for a transfer of charge acquired from a participating primary energy provider.

As illustrated on FIG. 8, an total amount of charge transferred to another device from a community member device may include charge initially acquired by the community member device from one or more participating primary energy provider (in the example illustrated on FIG. 8, PEP1 and PEP2).

For each primary energy provider for which a reward is to be determined, the reward may be determined by parsing through a detailed DSOC data record for the device before the charging transaction, based on the amount of charge transferred pursuant to the charging transaction, starting from the oldest charge acquisition.

In the example of FIG. 8, the oldest charging transaction is the one between the device and the PEP2, whereby the device acquired a charge amount equal to SOC_PEP2_12−SOC_PEP2_11.

If Q>SOC_PEP2_11, then PEP2 may reward the device. The reward amount may be based on the amount of charge acquired by the device from PEP2 within the amount of charge subsequently transferred by the device.

If Q<SOC_PEP2_12, the reward amount may be based on Q−SOC_PEP2_11.

Else if Q≥SOC_PEP2_12, the reward amount may be based on SOC_PEP2_12−SOC_PEP2_11.

Because there is no other charging transaction involving PEP2 in the detailed DSOC illustrated on FIG. 8, the total reward amount for PEP2 may be based on SOC_PEP2_12−SOC_PEP2_11.

As for PEP1, all the charging transactions involving PEP1 and stored in the detailed DSOC, to the extent of the charge amount transferred by the device, may be parsed for determining a reward amount for PEP1.

If Q<SOC_PEP1_11, then PEP1 may not reward the device.

If Q≥SOC_PEP1_11, and Q<SOC_PEP1_12, the PEP1 may reward the device based on Q−SOC_PEP1_11.

If Q≥SOC_PEP1_12 and Q<SOC_PEP1_21, the PEP1 may reward the device based on SOC_PEP1_12−SOC_PEP1_11.

If Q≥SOC_PEP1_21 and Q<SOC_PEP1_22, the PEP1 may reward the device based on (SOC_PEP1_12−SOC_PEP1_11)+(Q−SOC_PEP1_11).

In some embodiments, a primary energy provider PEPk may reward the device for NT previous charging transactions based on: $\Sigma_{i=1}^{NT-1}$ (SOC_PEPk_i2−SOC_PEPk_i1)+(Q−SOC_PEPk_NT1).

The determination of a reward base may be performed through a loop in some embodiments, as follows:

A current reward variable may be initialized to a null value, and the loop index may be initialized to i=1.

Each iteration i of the loop may comprises the following:

If Q<SOC_PEPk_i1, then if i=1 PEPk may not reward the device and the loop ends, otherwise the loop ends.

If Q≥SOC_PEPk_i1 and Q<SOC_PEPk_i2, the PEPk may reward the device based on a current reward to which Q−SOC_PEP1_11 is added, and the loop ends.

Else the PEPk may reward the device based on a current reward to which SOC_PEP1_i2−SOC_PEP1_i1 is added, and the index i may be incremented for another loop iteration corresponding to another charging transaction between the device and PEPk.

In order to account for charge efficiency which may not be ideal for the charge transfer from the device, the charge loss may be apportioned in the reward amount calculated for each primary energy provider, based on the respective charge amounts acquired from each PEP.

As described above and illustrated on FIG. 5, the reward may be determined as a charge credit amount, and provided to the device through a charge credit transaction between the PEP and the device.

In one or more embodiments, a new block may be generated that includes transaction data corresponding to such charge credit transaction, further to the obtaining of a DSOC based on which the charge credit amount will have been determined.

The new block may then be added to the blockchain in order to be taken account in the sequence of transactions stored in the blockchain for the device.

Figure 9:
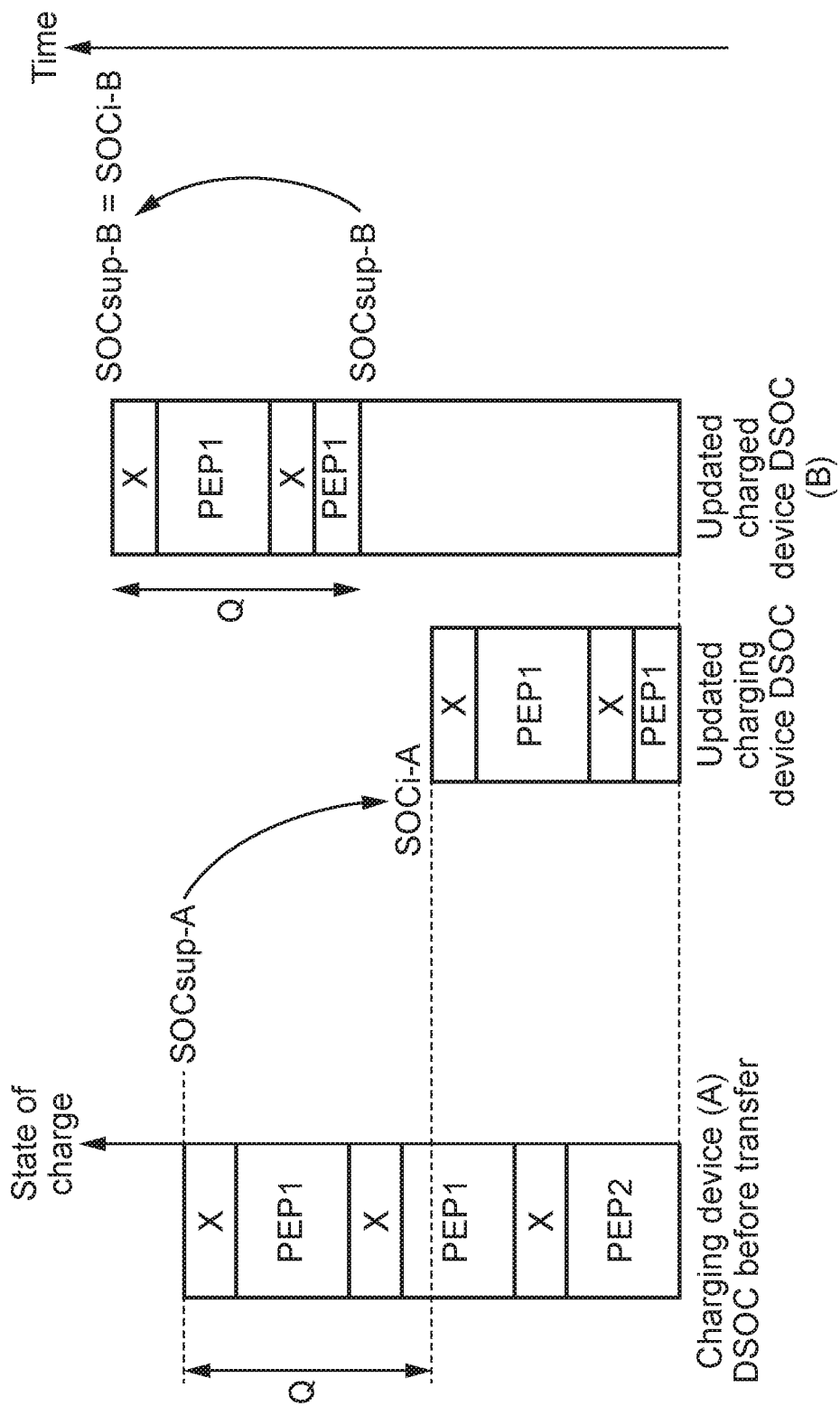
FIG. 9 illustrates the update of the DSOC of a community member device (A) in accordance with one or more embodiments.

FIG. 9 illustrates the update of the DSOC of a community member device (A) based on an amount of charge transferred from the energy storage unit of the community member device (A) to the charged device (B).

As discussed above with respect to FIG. 8, a complete time sequence corresponding to the one shown on FIG. 4, has been obtained for the community member device, that shows that the maximum charge SOCsup of the energy storage unit of the community member device was reached further to six consecutive (in time) charging transactions, among which a first charging transaction with a first participating primary energy provider PEP1, second, fourth, and sixth charging transactions with one or more non-participating entities, and third and fifth charging transactions with a second participating primary energy provider PEP2.

Once the charge transfer is completed, the DSOC data record may be updated in a FIFO-based manner as illustrated in FIGS. 7a and 8. In the example illustrated on FIG. 9, the transferred charge amount will be composed of all the charge acquired from the first charging transaction with PEP2, all the charge acquired from the second charging transaction with a non-participating entity, and only part of the charge acquired from the third transaction with PEP1 (first charging transaction with PEP1).

FIG. 9 also shows the update of the DSOC of a charged device (B), assuming that the charged device is also a community member device.

The DSOC of the charging device (A) and the DSOC of the charged device may both be updated, based on the amount of charge transferred from A to B.

The DSOC of the charging device (A) may be updated in a FIFO-based manner, by subtracting from the bottom of the DSOC an amount of charge corresponding to the amount of charge transferred to the charged device (B), possibly taking into account in some embodiments charge transfer losses. The maximum state of charge for the charging device (A), SOCsup_A, is updated to the value SOCi_A corresponding to SOCsup_A−Q.

The DSOC of the charged device (B) may be updated in a LIFO-based manner (Last In First Out), by adding to the top of the DSOC an amount of charge corresponding to the amount of charge transferred to the charged device (B), possibly taking into account in some embodiments charge transfer losses. The maximum state of charge for the charged device (B), SOCsup_B, is updated to the value SOCi_B corresponding to SOCsup_B+Q.

In some embodiments, the DSOC of the charged device (B) may be updated by copying an extract of the DSOC of the charging device (A) taken from the bottom of such DSOC and corresponding to the amount of charge transferred to the charged device (B), to the top of the DSOP of the charged device (B), so as the charged device (B) to advantageously obtain some information about the origin of the charge transferred thereto by the charging device (A).

In some embodiments, both updated DSOC data records, for the charging device (A) and for the charged device (B), may be included in the transaction data that is stored in the blockchain, to be used as a reference at the next charging transaction of either device.

Figure 10:
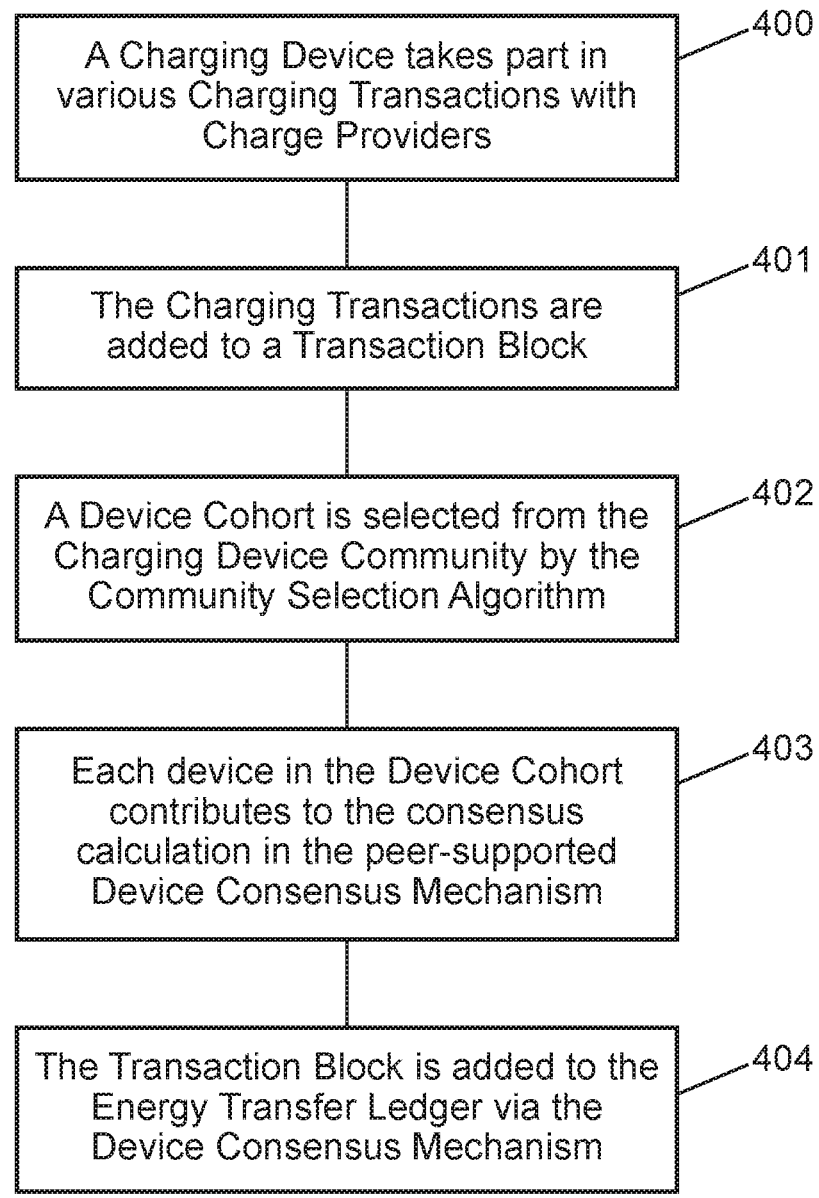
FIG. 10 is a block diagram illustrating a method which may be used for enabling a device-managed peer-to-peer energy transfer system according to one or more embodiments.

FIG. 10 illustrates a method which may be used for enabling a device-managed peer-to-peer energy transfer system such as that shown on FIG. 1.

The proposed method advantageously allows users to sell and acquire energy via a device (such as an electric vehicle), where transactions undertaken by that device are verified and recorded by other devices in the network through the proposed consensus mechanism.

In the following, embodiments of the present subject disclosure will be described using the non-limiting example of a device embarking on a journey and taking part in various charging transactions with a distributed network of charge providers (400). The charge providers may be other community members of the charging device community, and/or devices external to the charging device community.

The likelihood of the device taking part in a charging transaction and its behaviour during the transaction may, for example, be determined and controlled by various user-specified permissions, such as a maximum spend amount per day/week etc., preferred charging locations or times, and/or charge acquisition linked to a certain percentage of energy depletion.

In some embodiments, at a given point in time (e.g. at the end of the day or journey), each charging transaction the device has taken part in may be compiled into a transaction block (401), for example by a transaction block creation unit. The transaction block is associated with a new work task which must be completed in order to add that block to an energy transfer ledger.

A device cohort may then be selected (402) from the charging device community at random, for example by a cohort selection unit executing a cohort selection algorithm. Depending on the embodiment, the cohort selection may use broad selection criteria to choose the device cohort, for example including: selecting only those community members who have received charge within the same time period, and/or selecting only those community members who have received and provided charge within a certain time period.

Depending on the embodiment, the following device cohort selection strategies may be used, alone or in combination.

Those strategies may use the notion of calculation power of the device. For instance, one can assume that the calculation power of a potentially selectable electrical vehicle device may largely differ depending on the type of vehicle being part of the community. For example the calculation power of an electric car may be much higher than that of an electric scooter. In some embodiments, a candidate to a selection in the device cohort may transmit to the one or several network nodes running the cohort selection algorithm data indicating its calculation power capacity and/or data indicating its occupation state so that the following strategy options may be exercised.

The range allocation strategy may also adapt to this capabilities to balance the calculations task according a good trade off mining success time vs security.

As an example, related to the previous one, assuming that only 3 devices out of 4 have enough power calculations capabilities, the selected range might be:

Assuming N=3 and R=1024:

The member 1 of the device cohort which is the more powerful will test all the nonce in the range [0,511].

The member 2 of the device cohort will test all the nonce in the range [512,767].

The member 4 of the device cohort will test all the nonce in the range [768,1023].

In some embodiments, the device cohort may also be randomly constituted with devices by mixing a fair proportion of high calculation power capacity devices, middle calculation power capacity devices, and/or low calculation power capacity devices, so as to advantageously reduce the probability of high mining time.

In some embodiments, the device cohort may also be randomly constituted among currently idle devices, so that the selected devices may be in a position to dedicate almost their full calculation capacity to solve the subtask assigned to them.

In some embodiments, the device cohort may also be randomly constituted by mixing currently idle devices with currently busy ones to ensure enough calculation power for completing the work task.

Depending on the embodiment, any of the above device cohort selection strategies, or a combination thereof, may be used for selecting the devices that collectively participate to the completion of the work task.

In some embodiments, the subtask assignment strategy may take into account the remaining electric power available at a selectable device in order to ensure that only devices that have enough available power (either through a power line connection or through their remaining battery power) are selected for performing a subtask assigned to them. This will advantageously ensure that the devices running on a battery don't empty their battery by executing the subtask assigned to them.

In some embodiments, the cohort selection function (14*a*) may be configured to address or anticipate a case where a first (initial) random selection of devices does not lead to a device cohort with devices collectively having enough battery or computation power to perform the work task. For example, the cohort selection function (14*a*) may be configured for assigning respective priority levels to the additional criteria potentially used to select the devices of the device cohort. In some embodiments, the priority levels may be used for each selection of devices of the device cohort, including the initial one. Alternatively, the priority levels may be used to increase the number of selected devices in the case where the first (initial) random selection of devices does not lead to a device cohort with devices collectively having enough battery or computation power to perform the work task.

Using the above-described exemplary criteria, a priority level 1 may be assigned to the battery charge status of each device, a priority level 2 may be assigned to the computational capabilities of each device, and a priority level 3 may be assigned to the occupation status of each device, where priority level 1>priority level 2>priority level 3.

In one or more embodiments, each member of the device cohort takes part (403) in the device consensus mechanism. The device cohort collectively completes the work task associated with the current transaction block, with each of the many devices contributing a small part of the total work task, assigned to such device possibly using one or several of the above strategies.

The energy requirement of the work task on each member of the device cohort may therefore be negligible. As a consequence, in some embodiments, a checking that such energy requirement is not beyond the available power level of the respective device may be performed with a very low available power threshold, while requiring from the device as mandatory that the assigned subtask be performed. Devices may therefore not escape their contributing to the work task, for example by showing most of the time a battery level below the available power threshold used by the system.

In one or more embodiments, the proposed device consensus mechanism produces a trusted consensus and the transaction block is added (404) to the energy transfer ledger.

Advantageously, the consensus can be trusted because the many randomly selected devices in the device cohort are independent and unable to collude. A single entity cannot control sufficient numbers of the many randomly selected devices that would be required to fraudulently alter the energy transfer ledger.

Figure 11A:
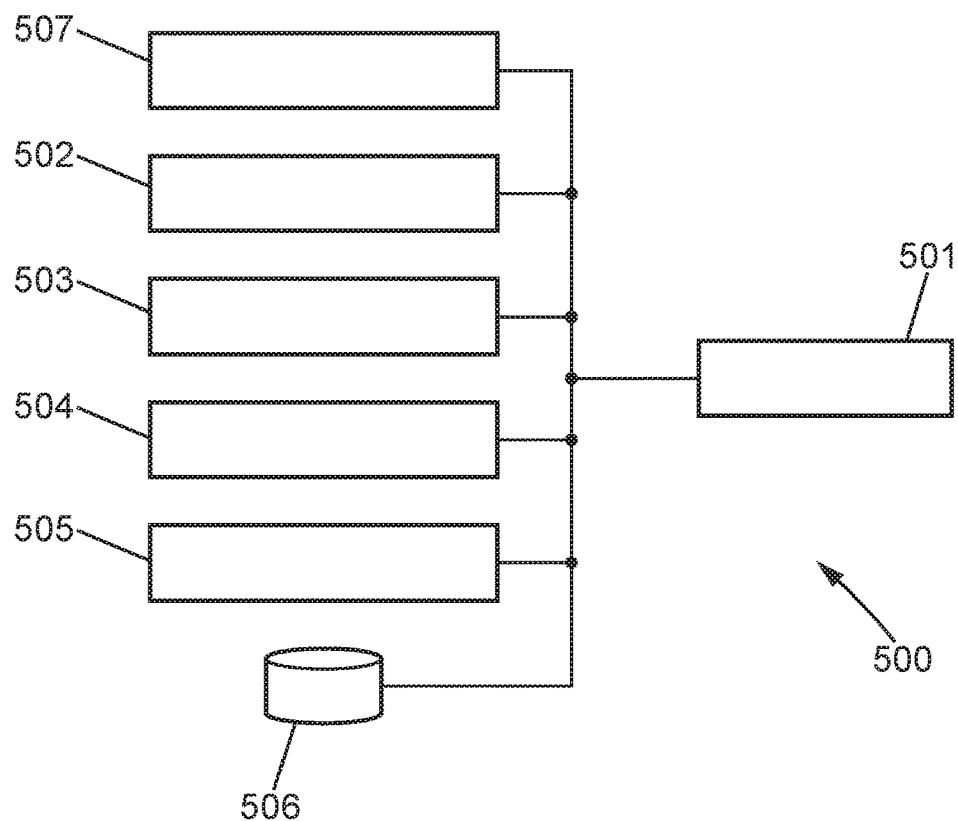
FIG. 11a illustrates an exemplary apparatus according to one or more embodiments.

FIG. 11a illustrates an exemplary apparatus 500 configured to use a database management feature in accordance with embodiments of the present subject disclosure.

The apparatus 500 includes a control engine 501, a cohort selection engine 502, a transaction block creation engine 503, a device consensus management engine 504, a data communication engine 505, a memory 506, a database management engine 507, and a power supply (e.g., a battery, plug-in power supply, etc.) (not represented on the figure).

In the architecture illustrated on FIG. 11a, all of the cohort selection engine 502, transaction block creation engine 503, device consensus management engine 504, data communication engine 505, database management engine 507, and memory 506 are operatively coupled with one another through the control engine 501.

In one or more embodiments, the cohort selection engine 502 is configured to perform various aspects of embodiments of the cohort selection algorithm as described herein.

In one or more embodiments, the transaction block creation engine 503 is configured to perform various aspects of embodiments of the transaction block creation as described herein.

In one or more embodiments, the device consensus management engine 504 is configured to perform various aspects of embodiments of the device consensus scheme as described herein.

In one or more embodiments, the database management engine 507 is configured to perform various aspects of embodiments of the database management as described herein.

In one or more embodiments, the data communication engine 505 is configured to receive and transmit data packets or messages, and process received data.

The control engine 501 includes one or more computers, each including at least a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 501 may also comprise, or may be in communication with, computer storage media, such as, without limitation, the memory 506, capable of storing computer program instructions or software code that, when executed by a processor, causes the processor to perform the elements described herein. In addition, the memory 506 may be any type of data storage computer storage medium, coupled to the control engine 501 and operable with the data communication engine 505, the cohort selection engine 502, the transaction block creation engine 503, the database management engine 507, and the device consensus management engine 504, to facilitate management and processing of data stored in association therewith.

In embodiments of the present subject disclosure, the apparatus 500 is configured for performing the database management methods described herein.

It will be appreciated that the apparatus 500 shown and described with reference to FIG. 11a is provided by way of example only. Numerous other architectures, operating environments, and configurations are possible. Other embodiments of the apparatus may include fewer or greater number of components, and may incorporate some or all of the functionality described with respect to the apparatus components shown in FIG. 11a. Accordingly, although the control engine 501, cohort selection engine 502, transaction block creation engine 503, device consensus management engine 304, data communication engine 505, the database management engine 507, and memory 506 are illustrated as part of the apparatus 500, no restrictions are placed on the location and control of those components 501-507. In particular, in other embodiments, any of such components 501-507 may be part of different entities or computing systems.

Figure 11B:
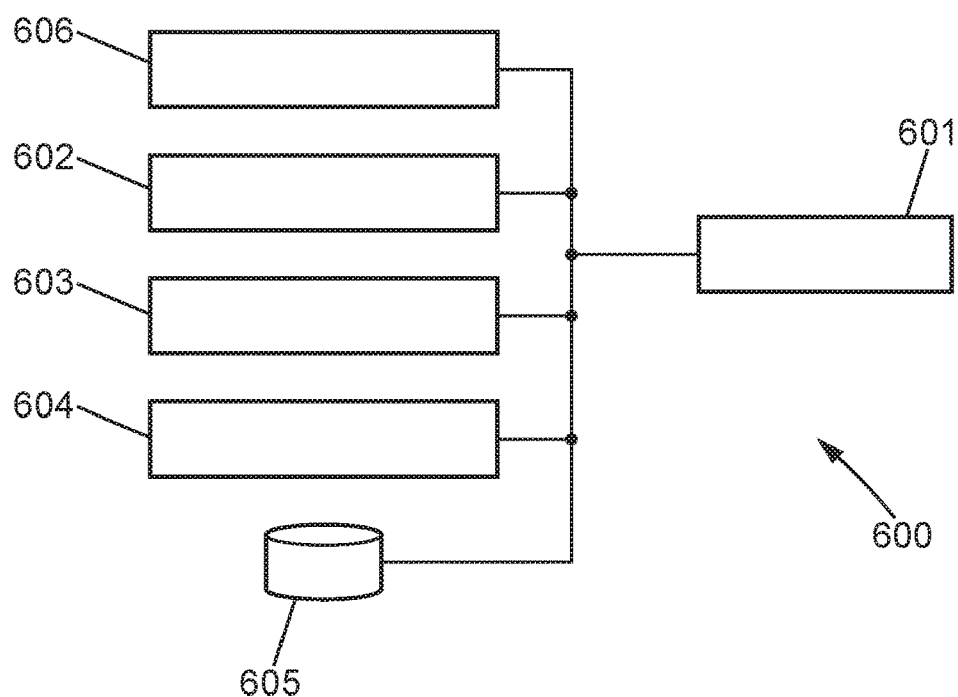
FIG. 11b illustrates an exemplary device according to one or more embodiments.

FIG. 11b illustrates an exemplary device 600 configured to use a charge management feature in accordance with embodiments of the present subject disclosure.

The device 600 includes a control engine 601, a subtask processing engine 602, a ledger management engine 603, a data communication engine 604, a memory 605, a charge management engine 606, and an energy storage unit (e.g., a battery) (not represented on the figure).

In the architecture illustrated on FIG. 11b, all of the subtask processing engine 602, ledger management engine 603, data communication engine 604, a charge management engine 606, and memory 605 are operatively coupled with one another through the control engine 601.

In one or more embodiments, the subtask processing engine 602 is configured to perform various aspects of embodiments of the proposed method for subtask completion as described herein. In particular, the subtask processing engine 602 may be configured to process a received subtask assignment for a new block to complete the subtask.

In one or more embodiments, the charge management engine 606 is configured to perform various aspects of embodiments of the proposed method for charge management as described herein. In particular, the charge management engine 606 may be configured to use a process for managing a charge of its energy storage unit as described herein (an exemplary embodiment of which being illustrated by FIG. 6).

In one or more embodiments, the ledger management engine 603 is configured to perform various aspects of embodiments of the proposed method as described herein. In particular, the ledger management engine 603 may be configured to maintain current a copy of an energy transfer ledger in the form of a blockchain, including by adding thereto a new block that has been verified, and to participate in the determining that the work task has been successfully completed.

In one or more embodiments, the data communication engine 604 is configured to receive and transmit data packets and/or message, and process received data.

The control engine 601 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. The control engine 601 may also comprise, or may be in communication with, computer storage media, such as, without limitation, the memory 605, capable of storing computer program instructions or software code that, when executed by the processor, causes the processor to perform the elements described herein. In addition, the memory 605 may be any type of data storage computer storage medium, capable of storing a data structure representing a blockchain as well as information related to the device 600, such as, for example, the verification resource information described above, coupled to the control engine 601 and operable with the data communication engine 404, the subtask processing engine 602, and the ledger management engine 603 to facilitate management and processing of data stored in association therewith.

It will be appreciated that the device 600 shown and described with reference to FIG. 11b is provided by way of example only. Numerous other architectures, operating environments, and configurations are possible. Other embodiments of the node may include fewer or greater number of components, and may incorporate some or all of the functionality described with respect to the device components shown in FIG. 11b. Accordingly, although the control engine 601, subtask processing engine 602, ledger management engine 603, charge management engine 606, data communication engine 604, and memory 605 are illustrated as part of the device 600, no restrictions are placed on the location and control of these components 601-606. In particular, in other embodiments, any of such components 601-606 may be part of different entities or computing systems.

Peer-to-peer energy trading is enabled in a way that maximises the user's capacity to sell energy, while maintaining a secure and verifiable record of the transactions that take place with minimum user effort.

Vehicle owner convenience is further increased by the ability of the electric vehicle to easily acquire charge in small bursts as required during the course of a journey, and for those transactions to be automatically and securely recorded by a blockchain.

While the invention has been described with respect to preferred embodiments, those skilled in the art will readily appreciate that various changes and/or modifications can be made to the invention without departing from the spirit or scope of the invention as defined by the appended claims.

In particular, any suitable consensus protocol, other than the peer-supported device consensus mechanism described herein, may be used for the addition of a new block in a blockchain data structure, and the present disclosure is not limited to any specific blockchain data structure or any specific protocol or mechanism for managing such blockchain, in particular a consensus protocol or mechanism.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by so voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A computer-implemented method of managing a database, the method comprising:
   determining a current block stored in a blockchain data structure stored in the database, which comprises data related to a first energy transfer transaction for transferring charge from an electric vehicle;
   further to the determination of the current block, searching the blockchain data structure for predetermined data indicating an energy transfer from at least one primary energy provider device controlled by a primary energy provider to the electric vehicle;
   upon determining in the blockchain data structure at least one block containing the predetermined data, generating a new block with data corresponding to a current reward transaction between the primary energy provider and the electric vehicle, based on data of the at least one block and data of the current block;
   validating the new block, including selecting a device cohort from among a plurality of community member devices that includes the electric vehicle, and partitioning a block verification computation task for the new block into sub-tasks for distribution among the device cohort to reduce an energy consumption for performing the sub-tasks by the device cohort; and
   adding the new block in the blockchain data structure.

2. The method according to claim 1, wherein the search is performed on at least one block of a search block set in the blockchain data structure, wherein each block of the search block set other than the current block precedes the current block in the blockchain data structure.

3. The method according to claim 1, further comprising:
   receiving, from the electric vehicle, a detailed state of charge, DSOC, data record of an energy storage unit of the electric vehicle, wherein the DSOC data record comprises data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit;
   generating, based on the DSOC data record, the current block to be inserted in the blockchain data structure and comprising transaction data related to a charging transaction corresponding to an energy transfer between the electric vehicle and a charged device for transferring charge from the energy storage unit of the electric vehicle to the charged device, wherein the DSOC data record comprises information related to an amount of charge transferred from the energy storage unit of the electric vehicle to the charged device.

4. The method according to claim 1, wherein the predetermined data comprises a detailed state of charge, DSOC, data record of an energy storage unit of the electric vehicle, wherein the DSOC data record comprises data representing a sequence of one or more subsequent charging transactions for transferring charge from the primary energy provider to the energy storage unit, data representing a maximum state of charge of the energy storage unit, and, for each charging transaction, data representing an amount of charge acquired by the energy storage unit.

5. The method according to claim 1, wherein the predetermined data comprises identification information of the primary energy provider and transaction type information indicating at a type of transaction for transferring charge provided by the primary energy provider to the electric vehicle.

6. The method according to claim 1, further comprising: performing iterations of a blockchain sequential search loop, wherein each iteration of the loop comprises: searching for the predetermined data in a payload part of a current search block immediately following in the blockchain a previous search block processed during an immediately preceding iteration of the loop, wherein the loop is initialized with the current search block immediately preceding the current block in the blockchain.

7. The method according to claim 1, further comprising: further to the determination of the current block, searching the search block set in the blockchain for determining at least one second block, other than the current block, containing data related to at least one second energy transfer transaction for transferring charge from the electric vehicle; and
generating the new block based on data of the at least one second block.

8. The method according to claim 1, further comprising, upon determining in the blockchain a plurality of blocks containing the predetermined data, generating the new block based on data of the plurality of blocks.

9. The computer-implemented method of claim 1, wherein the electric vehicle is one of an electric car, electric truck, electric bus, electric delivery autonomous vehicle, electric scooter, or electric bicycle.

10. An apparatus, the apparatus comprising a processor and a memory operatively coupled to the processor, wherein the processor comprises:
a database management engine configured to determine a current block stored in a blockchain data structure stored in a database, which comprises data related to a first energy transfer transaction for transferring charge from an electric vehicle;
wherein the database management engine is further configured to search the blockchain data structure for predetermined data indicating an energy transfer from at least one primary energy provider device controlled by a primary energy provider to the electric vehicle;
wherein the processor further comprises a block creation engine configured to, upon determining in the blockchain data structure at least one block containing the predetermined data, generate a new block with data corresponding to a current reward transaction between the primary energy provider and the community member, based on data of the at least one block and data of the current block;
wherein the processor further comprises a cohort selection engine configured to select a device cohort from among a plurality of community member devices that includes the electric vehicle;
wherein the processor further comprises a device consensus engine configured to validate the new block and partition a block verification computation task for the new block into sub-tasks for distribution among the device cohort to reduce an energy consumption for performing the sub-tasks by the device cohort; and
wherein the database management engine is further configured to add the new block in the blockchain data structure.

11. The apparatus according to claim 10, wherein the search is performed on at least one block of a search block set in the blockchain data structure, wherein each block of the search block set other than the current block precedes the current block in the blockchain data structure.

12. The apparatus according to claim 10, wherein the processor
further comprises a data communication engine configured to receive, from the electric vehicle, a detailed state of charge, DSOC, data record of an energy storage unit of the electric vehicle, wherein the DSOC data record comprises data representing a sequence of one or more subsequent charging transactions for transferring charge from a primary energy provider to the energy storage unit, data representing a maximum state of charge of the energy storage unit, and, for each charging transaction, data representing an amount of charge acquired by the energy storage unit;
wherein the block creation engine is configured to generate, based on the DSOC data record, the current block to be inserted in the blockchain data structure and comprising transaction data related to a charging transaction corresponding to an energy transfer between the electric vehicle and a charged device for transferring charge from the energy storage unit of the electric vehicle to the charged device, wherein the DSOC data record comprises information related to an amount of charge transferred from the energy storage unit of the electric vehicle to the charged device.

13. The apparatus according to claim 10, wherein the predetermined data comprises a detailed state of charge, DSOC, data record of an energy storage unit of the electric vehicle, wherein the DSOC data record comprises data representing a sequence of one or more subsequent charging transactions for transferring charge from the primary energy provider to the energy storage unit, data representing a maximum state of charge of the energy storage unit, and, for each charging transaction, data representing an amount of charge acquired by the energy storage unit.

14. The apparatus according to claim 10, wherein the predetermined data comprises identification information of the primary energy provider and transaction type information indicating at a type of transaction for transferring charge provided by the primary energy provider to the electric vehicle.

15. The apparatus according to claim 10, wherein the database management engine is further configured to perform iterations of a blockchain sequential search loop, wherein each iteration of the loop comprises: searching for the predetermined data in a payload part of a current search block immediately following in the blockchain a previous search block processed during an immediately preceding iteration of the loop, wherein the loop is initialized with the current search block immediately preceding the current block in the blockchain.

16. A non-transitory computer-readable medium encoded with executable instructions which, when executed, causes an apparatus comprising a processor operatively coupled with a memory, to:
determine a current block stored in a blockchain data structure stored in the database, which comprises data related to a first energy transfer transaction for transferring charge from an electric vehicle;
further to the determination of the current block, search the blockchain data structure for predetermined data indicating an energy transfer from at least one primary energy provider device controlled by a primary energy provider to the electric vehicle;
upon determining in the blockchain data structure at least one block containing the predetermined data, generate a new block with data corresponding to a current reward transaction between the primary energy provider and the community member, based on data of the at least one block and data of the current block;

validate the new block, including selecting a device cohort from among a plurality of community member devices that includes the electric vehicle, and partitioning a block verification computation task for the new block into sub-tasks for distribution among the device cohort to reduce an energy consumption for performing the sub-tasks by the device cohort; and add the new block in the blockchain data structure.

* * * * *